(12) United States Patent
Blandino et al.

(10) Patent No.: US 12,532,386 B2
(45) Date of Patent: Jan. 20, 2026

(54) ARTICLE FOR USE WITH APPARATUS FOR HEATING SMOKABLE MATERIAL

(71) Applicant: BRITISH AMERICAN TOBACCO (INVESTMENTS) LIMITED, London (GB)

(72) Inventors: Thomas P. Blandino, Cottage Grove, WI (US); Andrew P. Wilke, Madison, WI (US); James J. Frater, Madison, WI (US); Benjamin J. Paprocki, Cottage Grove, WI (US); Duane A. Kaufman, Hollandale, WI (US); Raymond J. Robey, Madison, WI (US); John Miller, Marshall, WI (US)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 0 days.

(21) Appl. No.: 16/946,043

(22) Filed: Jun. 3, 2020

(65) Prior Publication Data
US 2020/0288774 A1    Sep. 17, 2020

Related U.S. Application Data

(63) Continuation of application No. 15/772,394, filed on Apr. 30, 2018, now abandoned, which is a
(Continued)

(51) Int. Cl.
*H05B 6/10* (2006.01)
*A24D 1/04* (2006.01)
(Continued)

(52) U.S. Cl.
CPC ............ *H05B 6/105* (2013.01); *A24D 1/042* (2013.01); *A24D 1/20* (2020.01); *A24F 40/46* (2020.01);
(Continued)

(58) Field of Classification Search
CPC .................. A24F 47/008; A24D 1/02
See application file for complete search history.

(56) References Cited

U.S. PATENT DOCUMENTS

| 2,592,554 A | 4/1952 | Frankenburg |
| 2,860,638 A | 11/1958 | Frank et al. |

(Continued)

FOREIGN PATENT DOCUMENTS

| AU | 2014369867 A1 | 6/2016 |
| AU | 2017289114 B2 | 4/2020 |

(Continued)

OTHER PUBLICATIONS

Application and File History for U.S. Appl. No. 16/311,411, filed Dec. 19, 2018, inventors: Abi Aoun et al.
(Continued)

*Primary Examiner* — Michael H. Wilson
*Assistant Examiner* — Jennifer A Kessie
(74) *Attorney, Agent, or Firm* — WOMBLE BOND DICKINSON (US) LLP

(57) ABSTRACT

Disclosed is an article for use with apparatus for heating smokable material to volatilize at least one component of the smokable material. The article includes a sheet including smokable material, and heating material that is heatable by penetration with a varying magnetic field to heat the smokable material. The sheet may be a planar sheet or a rolled sheet. Also disclosed is a system including the article and apparatus for heating smokable material to volatilize at least one component of the smokable material. The apparatus includes a heating zone for receiving at least a portion of the article, and a magnetic field generator for generating a varying magnetic field to be used in heating the smokable material when the portion of the article is in the heating zone.

10 Claims, 3 Drawing Sheets

Related U.S. Application Data continuation of application No. PCT/EP2016/075737, filed on Oct. 26, 2016, which is a continuation of application No. 14/927,539, filed on Oct. 30, 2015, now abandoned.

(51) Int. Cl.

| | | |
|---|---|---|
| *A24D 1/20* | (2020.01) | |
| *A24F 40/20* | (2020.01) | |
| *A24F 40/46* | (2020.01) | |
| *A24F 40/465* | (2020.01) | |
| *H05B 3/00* | (2006.01) | |
| *H05B 3/34* | (2006.01) | |

(52) U.S. Cl.
CPC ......... *A24F 40/465* (2020.01); *H05B 3/0014* (2013.01); *H05B 3/34* (2013.01); *A24F 40/20* (2020.01)

(56) References Cited

U.S. PATENT DOCUMENTS

| | | | |
|---|---|---|---|
| 3,065,756 A | | 11/1962 | Noel et al. |
| 3,144,174 A | | 8/1964 | Henry et al. |
| 3,173,612 A | | 3/1965 | Gut et al. |
| 3,517,151 A | | 6/1970 | Mekjean et al. |
| 3,596,034 A | | 7/1971 | Mekjean |
| 4,149,548 A | | 4/1979 | Bradshaw |
| 4,913,168 A | | 4/1990 | Potter et al. |
| 4,944,317 A | | 7/1990 | Thal |
| 5,093,894 A | | 3/1992 | Deevi et al. |
| 5,144,962 A | | 9/1992 | Counts et al. |
| 5,317,132 A | | 5/1994 | Clough et al. |
| 5,369,249 A | | 11/1994 | Kwon |
| 5,613,505 A | * | 3/1997 | Campbell ............. A24F 47/008 131/194 |
| 5,649,554 A | | 7/1997 | Sprinkel et al. |
| 6,053,176 A | | 4/2000 | Adams et al. |
| 6,632,407 B1 | | 10/2003 | Lau et al. |
| 6,803,550 B2 | | 10/2004 | Sharpe et al. |
| 7,185,659 B2 | | 3/2007 | Sharpe |
| 7,185,959 B2 | | 3/2007 | Mueller et al. |
| 7,810,505 B2 | | 10/2010 | Yang |
| 8,459,271 B2 | | 6/2013 | Inagaki |
| 8,807,140 B1 | | 8/2014 | Scatterday |
| 8,910,640 B2 | | 12/2014 | Sears et al. |
| 9,357,803 B2 | | 6/2016 | Egoyants et al. |
| 9,554,598 B2 | | 1/2017 | Egoyants et al. |
| 9,710,921 B2 | | 7/2017 | Wong et al. |
| 9,980,512 B2 | | 5/2018 | Collett et al. |
| 10,420,372 B2 | | 9/2019 | Suzuki et al. |
| 10,524,508 B2 | | 1/2020 | Sur et al. |
| 2002/0005207 A1 | | 1/2002 | Wrenn et al. |
| 2002/0078951 A1 | | 6/2002 | Nichols et al. |
| 2002/0078956 A1 | | 6/2002 | Sharpe et al. |
| 2003/0007887 A1 | | 1/2003 | Roumpos et al. |
| 2003/0102304 A1 | | 6/2003 | Boyers |
| 2003/0230567 A1 | | 12/2003 | Centanni et al. |
| 2004/0149297 A1 | | 8/2004 | Sharpe |
| 2005/0025213 A1 | | 2/2005 | Parks |
| 2005/0045193 A1 | | 3/2005 | Yang |
| 2007/0267409 A1 | | 11/2007 | Gard et al. |
| 2009/0120928 A1 | | 5/2009 | Lee et al. |
| 2009/0151717 A1 | | 6/2009 | Bowen et al. |
| 2009/0293888 A1 | | 12/2009 | Williams et al. |
| 2010/0024834 A1 | | 2/2010 | Oglesby et al. |
| 2010/0181387 A1 | | 7/2010 | Zaffaroni et al. |
| 2011/0240022 A1 | | 10/2011 | Hodges et al. |
| 2011/0271971 A1 | | 11/2011 | Conner et al. |
| 2012/0145703 A1 | | 6/2012 | Matsen et al. |
| 2012/0214926 A1 | | 8/2012 | Berthold et al. |
| 2012/0234315 A1 | | 9/2012 | Li et al. |
| 2012/0305545 A1 | | 12/2012 | Brosnan et al. |
| 2013/0030125 A1 | | 1/2013 | Buryak et al. |
| 2013/0133675 A1 | | 5/2013 | Shinozaki et al. |
| 2013/0160780 A1 | | 6/2013 | Matsumoto et al. |
| 2014/0060554 A1 | | 3/2014 | Collett et al. |
| 2014/0158144 A1 | | 6/2014 | Kaljura et al. |
| 2014/0216485 A1 | | 8/2014 | Egoyants et al. |
| 2014/0224267 A1 | | 8/2014 | Levitz et al. |
| 2014/0301721 A1 | | 10/2014 | Ruscio et al. |
| 2015/0040925 A1 | | 2/2015 | Saleem et al. |
| 2015/0181937 A1 | | 7/2015 | Dubief et al. |
| 2015/0201670 A1 | | 7/2015 | Crooks et al. |
| 2015/0201675 A1 | | 7/2015 | Lord |
| 2015/0237913 A1 | | 8/2015 | Suzuki et al. |
| 2015/0245669 A1 | | 9/2015 | Cadieux et al. |
| 2015/0272219 A1 | | 10/2015 | Hatrick et al. |
| 2015/0335062 A1 | | 11/2015 | Shinkawa et al. |
| 2016/0007652 A1 | | 1/2016 | Taluskie et al. |
| 2016/0012022 A1 | | 1/2016 | Lim |
| 2016/0120221 A1 | | 5/2016 | Mironov et al. |
| 2016/0150825 A1 | | 6/2016 | Mironov et al. |
| 2016/0192708 A1 | | 7/2016 | DeMeritt et al. |
| 2016/0324215 A1 | | 11/2016 | Mironov et al. |
| 2016/0331031 A1 | * | 11/2016 | Malgat .................. A24F 47/008 |
| 2017/0027233 A1 | * | 2/2017 | Mironov .............. H05B 1/0244 |
| 2017/0055574 A1 | | 3/2017 | Kaufman et al. |
| 2017/0055575 A1 | | 3/2017 | Wilke et al. |
| 2017/0055580 A1 | | 3/2017 | Blandino et al. |
| 2017/0055581 A1 | | 3/2017 | Wilke et al. |
| 2017/0055582 A1 | | 3/2017 | Blandino et al. |
| 2017/0055583 A1 | | 3/2017 | Blandino et al. |
| 2017/0055584 A1 | | 3/2017 | Blandino et al. |
| 2017/0055585 A1 | | 3/2017 | Fursa et al. |
| 2017/0071250 A1 | | 3/2017 | Mironov et al. |
| 2017/0095006 A1 | | 4/2017 | Egoyants et al. |
| 2017/0119046 A1 | | 5/2017 | Kaufman et al. |
| 2017/0119047 A1 | | 5/2017 | Blandino et al. |
| 2017/0119048 A1 | | 5/2017 | Kaufman et al. |
| 2017/0119049 A1 | | 5/2017 | Blandino et al. |
| 2017/0119050 A1 | | 5/2017 | Blandino et al. |
| 2017/0119051 A1 | | 5/2017 | Blandino et al. |
| 2017/0156403 A1 | | 6/2017 | Gill et al. |
| 2017/0174418 A1 | | 6/2017 | Cai |
| 2017/0199048 A1 | | 7/2017 | Igumnov et al. |
| 2017/0224015 A1 | | 8/2017 | Basil et al. |
| 2017/0251718 A1 | | 9/2017 | Armoush et al. |
| 2017/0325506 A1 | | 11/2017 | Batista |
| 2018/0228217 A1 | | 8/2018 | Mironov et al. |
| 2018/0235279 A1 | | 8/2018 | Wilke et al. |
| 2018/0242633 A1 | | 8/2018 | Wilke et al. |
| 2018/0242636 A1 | | 8/2018 | Blandino et al. |
| 2018/0279677 A1 | | 10/2018 | Blandino et al. |
| 2018/0317552 A1 | | 11/2018 | Kaufman et al. |
| 2018/0317553 A1 | | 11/2018 | Blandino et al. |
| 2018/0317555 A1 | | 11/2018 | Blandino et al. |
| 2018/0325173 A1 | | 11/2018 | Blandino et al. |
| 2018/0360123 A1 | | 12/2018 | Silvestrini |
| 2019/0159517 A1 | | 5/2019 | Ballesteros Gomez et al. |
| 2019/0191780 A1 | | 6/2019 | Wilke et al. |
| 2019/0230988 A1 | | 8/2019 | Aoun |
| 2019/0239555 A1 | | 8/2019 | Nicholson |
| 2020/0054068 A1 | | 2/2020 | Blandino et al. |
| 2020/0054069 A1 | | 2/2020 | Blandino et al. |
| 2020/0229497 A1 | | 7/2020 | Aoun et al. |
| 2020/0268053 A1 | | 8/2020 | Thorsen et al. |
| 2020/0288774 A1 | | 9/2020 | Blandino et al. |
| 2021/0100281 A1 | | 4/2021 | Abi Aoun et al. |
| 2022/0015408 A1 | | 1/2022 | Blandino et al. |

FOREIGN PATENT DOCUMENTS

| | | |
|---|---|---|
| CA | 2003521 A1 | 5/1990 |
| CA | 2003522 A1 | 5/1990 |
| CA | 2937722 A1 | 11/2015 |
| CA | 2974770 A1 | 12/2015 |
| CA | 2982164 A1 | 10/2016 |
| CN | 1126426 A | 7/1996 |
| CN | 2393205 Y | 8/2000 |
| CN | 2738167 Y | 11/2005 |
| CN | 2924411 Y | 7/2007 |
| CN | 101084801 A | 12/2007 |
| CN | 201076006 Y | 6/2008 |

(56) References Cited

FOREIGN PATENT DOCUMENTS

| | | |
|---|---|---|
| CN | 201088138 Y | 7/2008 |
| CN | 101277623 A | 10/2008 |
| CN | 101326138 A | 12/2008 |
| CN | 101390659 A | 3/2009 |
| CN | 201199922 Y | 3/2009 |
| CN | 101951796 A | 1/2011 |
| CN | 201762288 U | 3/2011 |
| CN | 101326138 B | 1/2013 |
| CN | 103202540 A | 7/2013 |
| CN | 203369386 U | 1/2014 |
| CN | 203435685 U | 2/2014 |
| CN | 103689812 A | 4/2014 |
| CN | 203735483 U | 7/2014 |
| CN | 103988576 A | 8/2014 |
| CN | 203748687 U | 8/2014 |
| CN | 203762288 U | 8/2014 |
| CN | 104013109 A | 9/2014 |
| CN | 104095291 A | 10/2014 |
| CN | 104256899 A | 1/2015 |
| CN | 204091003 U | 1/2015 |
| CN | 104365175 A | 2/2015 |
| CN | 104470387 A | 3/2015 |
| CN | 104480800 A | 4/2015 |
| CN | 104619202 A | 5/2015 |
| CN | 104664608 A | 6/2015 |
| CN | 104768407 A | 7/2015 |
| CN | 204519366 U | 8/2015 |
| CN | 204539505 U | 8/2015 |
| CN | 204599333 U | 9/2015 |
| CN | 104994757 A | 10/2015 |
| CN | 105188425 A | 12/2015 |
| CN | 105682488 A | 6/2016 |
| CN | 104095291 B | 1/2017 |
| EA | 009116 B1 | 10/2007 |
| EP | 0430559 A2 | 6/1991 |
| EP | 0430566 A2 | 6/1991 |
| EP | 0488488 A1 | 6/1992 |
| EP | 0703735 A1 | 4/1996 |
| EP | 0703735 B1 | 7/2001 |
| EP | 1357025 A2 | 10/2003 |
| EP | 1454840 A1 | 9/2004 |
| EP | 1454840 B1 | 9/2006 |
| EP | 1940254 A2 | 7/2008 |
| EP | 2059091 A2 | 5/2009 |
| EP | 1357025 B1 | 7/2009 |
| EP | 2186833 A1 | 5/2010 |
| EP | 2316286 A1 | 5/2011 |
| EP | 2327318 A1 | 6/2011 |
| EP | 2444112 A1 | 4/2012 |
| EP | 2253541 B1 | 5/2012 |
| EP | 2460424 A1 | 6/2012 |
| EP | 2903552 A1 | 8/2015 |
| EP | 2907397 A1 | 8/2015 |
| EP | 3367823 A2 | 9/2018 |
| EP | 3542747 A1 | 9/2019 |
| EP | 3632244 A1 | 4/2020 |
| GB | 347650 A | 4/1931 |
| GB | 2495923 A | 5/2013 |
| GB | 2504732 A | 2/2014 |
| GB | 2504733 A | 2/2014 |
| JP | S457120 Y1 | 4/1970 |
| JP | H03113366 A | 5/1991 |
| JP | H0556298 U | 7/1993 |
| JP | H07502188 A | 3/1995 |
| JP | H0850422 A | 2/1996 |
| JP | H0851175 A | 2/1996 |
| JP | H08511175 A | 11/1996 |
| JP | 2001174054 A | 6/2001 |
| JP | 2002043047 A | 2/2002 |
| JP | 2002144451 A | 5/2002 |
| JP | 2002252078 A | 9/2002 |
| JP | 2004121594 A | 4/2004 |
| JP | 3588469 B2 | 11/2004 |
| JP | 2004331191 A | 11/2004 |
| JP | 2008050422 A | 3/2008 |
| JP | 2008511175 A | 4/2008 |
| JP | 2009087703 A | 4/2009 |
| JP | 2010022754 A | 2/2010 |
| JP | 2010050834 A | 3/2010 |
| JP | 2010508034 A | 3/2010 |
| JP | WO2010113702 A1 | 10/2012 |
| JP | 2013013441 A | 1/2013 |
| JP | 2013515465 A | 5/2013 |
| JP | 2015524261 A | 8/2015 |
| JP | 2015531601 A | 11/2015 |
| JP | 2016508744 A | 3/2016 |
| JP | 2016516402 A | 6/2016 |
| JP | 2016538842 A | 12/2016 |
| JP | 6077145 B2 | 2/2017 |
| JP | 2017515490 A | 6/2017 |
| JP | 2020512487 A | 4/2020 |
| JP | 6875044 B2 | 5/2021 |
| JP | 6933323 B2 | 9/2021 |
| KR | 880701636 A | 11/1988 |
| KR | 100385395 B1 | 8/2003 |
| KR | 100449444 B1 | 8/2005 |
| KR | 20100108565 A | 10/2010 |
| KR | 20130029697 A | 3/2013 |
| KR | 20150027069 A | 3/2015 |
| KR | 20150040012 A | 4/2015 |
| KR | 20150047616 A | 5/2015 |
| KR | 20150132112 A | 11/2015 |
| KR | 20150143877 A | 12/2015 |
| KR | 20160064159 A | 6/2016 |
| KR | 20170008209 A | 1/2017 |
| RU | 2132629 C1 | 7/1999 |
| RU | 2135054 C1 | 8/1999 |
| RU | 103281 U1 | 4/2011 |
| RU | 2425608 C2 | 8/2011 |
| RU | 2509516 C2 | 3/2014 |
| RU | 2517125 C2 | 5/2014 |
| RU | 2531890 C2 | 10/2014 |
| RU | 2015106592 A | 11/2016 |
| RU | 2682772 C1 | 3/2019 |
| UA | 125609 C2 | 5/2022 |
| WO | WO-8404698 A1 | 12/1984 |
| WO | WO-9409842 A1 | 5/1994 |
| WO | WO-9527411 A1 | 10/1995 |
| WO | WO-9527412 A1 | 10/1995 |
| WO | WO-9618662 A1 | 6/1996 |
| WO | WO-02089532 A1 | 11/2002 |
| WO | WO-02098389 A1 | 12/2002 |
| WO | WO-2007051163 A2 | 5/2007 |
| WO | WO-2008015441 A1 | 2/2008 |
| WO | WO-2009079641 A2 | 6/2009 |
| WO | 2010/073122 A1 | 7/2010 |
| WO | WO-2010133342 A1 | 11/2010 |
| WO | WO-2011130414 A1 | 10/2011 |
| WO | WO-2012134117 A2 | 10/2012 |
| WO | WO-2012164009 A2 | 12/2012 |
| WO | WO-2013034459 A1 | 3/2013 |
| WO | WO-2013098395 A1 | 7/2013 |
| WO | WO-2013098409 A1 | 7/2013 |
| WO | WO-2013131763 A1 | 9/2013 |
| WO | WO-2013131764 A1 | 9/2013 |
| WO | WO-2013144324 A1 | 10/2013 |
| WO | WO-2013178766 A1 | 12/2013 |
| WO | WO-2014023965 A1 | 2/2014 |
| WO | WO-2014023967 A1 | 2/2014 |
| WO | WO-2014048745 A1 | 4/2014 |
| WO | WO-2014054035 A1 | 4/2014 |
| WO | WO-2014061477 A1 | 4/2014 |
| WO | WO-2014102092 A1 | 7/2014 |
| WO | WO-2014104078 A1 | 7/2014 |
| WO | WO-2014139611 A1 | 9/2014 |
| WO | WO-2014140320 A1 | 9/2014 |
| WO | WO-2015019101 A1 | 2/2015 |
| WO | WO-2015062983 A2 | 5/2015 |
| WO | WO-2015071682 A1 | 5/2015 |
| WO | WO-2015082648 A1 | 6/2015 |
| WO | WO-2015082649 A1 | 6/2015 |
| WO | WO-2015082651 A1 | 6/2015 |
| WO | WO-2015082652 A1 | 6/2015 |
| WO | WO-2015082653 A1 | 6/2015 |

(56) References Cited

FOREIGN PATENT DOCUMENTS

| WO | WO-2015100361 A1 | 7/2015 |
|---|---|---|
| WO | WO-2015101479 A1 | 7/2015 |
| WO | WO-2015116934 A1 | 8/2015 |
| WO | WO-2015117702 A1 | 8/2015 |
| WO | WO-2015131058 A1 | 9/2015 |
| WO | WO-2015155289 A1 | 10/2015 |
| WO | WO-2015166245 A2 | 11/2015 |
| WO | WO-2015175568 A1 | 11/2015 |
| WO | WO-2015176898 A1 | 11/2015 |
| WO | WO-2015177043 A1 | 11/2015 |
| WO | WO-2015177044 A1 | 11/2015 |
| WO | WO-2015177045 A1 | 11/2015 |
| WO | WO-2015177046 A1 | 11/2015 |
| WO | WO-2015177247 A1 | 11/2015 |
| WO | WO-2015177253 A1 | 11/2015 |
| WO | WO-2015177255 A1 | 11/2015 |
| WO | WO-2015177257 A1 | 11/2015 |
| WO | WO-2015177264 A1 | 11/2015 |
| WO | WO-2015177294 A1 | 11/2015 |
| WO | WO-2015198015 A1 | 12/2015 |
| WO | WO-2016023965 A1 | 2/2016 |
| WO | WO-2016075426 A1 | 5/2016 |
| WO | WO-2016075436 A1 | 5/2016 |
| WO | 2016088037 A1 | 6/2016 |
| WO | WO-2016096865 A2 | 6/2016 |
| WO | WO-2016162446 A1 | 10/2016 |
| WO | WO-2016207407 A1 | 12/2016 |
| WO | WO-2017005705 A1 | 1/2017 |
| WO | WO-2017029269 A1 | 2/2017 |
| WO | WO-2017036950 A2 | 3/2017 |
| WO | WO-2017036951 A1 | 3/2017 |
| WO | WO-2017036954 A1 | 3/2017 |
| WO | WO-2017036955 A2 | 3/2017 |
| WO | WO-2017036957 A1 | 3/2017 |
| WO | WO-2017036958 A2 | 3/2017 |
| WO | WO-2017036959 A1 | 3/2017 |
| WO | WO-2017036958 A3 | 4/2017 |
| WO | WO-2017068098 A1 | 4/2017 |
| WO | WO-2017072145 A1 | 5/2017 |
| WO | WO-2017072146 A1 | 5/2017 |
| WO | WO-2017072147 A2 | 5/2017 |
| WO | WO-2017072148 A1 | 5/2017 |
| WO | WO-2017072147 A3 | 7/2017 |
| WO | WO-2017167932 A1 | 10/2017 |

OTHER PUBLICATIONS

Application and File History for U.S. Appl. No. 16/311,418, filed Dec. 19, 2018, inventors: Abi Aoun et al.
Application and File History for U.S. Appl. No. 16/647,325, filed Mar. 13, 2020, inventors Thorsen et al.
Application and File History for U.S. Appl. No. 15/733,194, filed Jan. 14, 2021, inventors Abi Aoun et al.
Application and File History for U.S. Appl. No. 16/947,215, filed Jul. 23, 2020, inventors Kaufman et al.
Application and File History for U.S. Appl. No. 15/754,834, filed Feb. 23, 2018, inventor Thomas P. Blandino.
Application and File History for U.S. Appl. No. 15/772,396, filed Apr. 30, 2018, inventor Thomas P. Blandino.
Application and File History for U.S. Appl. No. 15/772,399, filed Apr. 30, 2018, inventor Thomas P. Blandino.
Application and File History for U.S. Appl. No. 16/311,405, filed Dec. 19, 2018, inventors Abi Aoun et al.
Communication pursuant to Article 94(3) EPC for Application No. 16798648.8, mailed on Nov. 19, 2020, 9 pages.
English Translation of Chinese Office Action, Application No. 2016800490915, mailed Aug. 14, 2020, 8 pages.
European Search Report for European Application No. 20205063.9, mailed on Feb. 18, 2021. 13 pages.
Examination Report for Australian Application No. 2016313708, mailed on Nov. 1, 2019, 7 pages.
Examination Report for Australian Application No. 2016313708, mailed on Nov. 23, 2018, 6 pages.
Examination Report mailed Sep. 6, 2019 for Australian Application No. 2017289114, 7 pages.
Examination Report No. 1 for Australian Patent Application No. 2018334042 dated Dec. 16, 2020, 4 pages.
Extended European Search Report for Application No. 20202666.2, mailed on Feb. 19, 2021, 14 pages.
Extended European Search Report for Application No. 20205065.4, mailed on Mar. 10, 2021, 14 pages.
Extended European Search Report for Application No. EP20205306. 2, mailed on Feb. 19, 2021, 12 pages.
First Office Action and Search Report dated Mar. 4, 2020 for Chinese Application No. 201680077608.1 filed Oct. 26, 2016, 18 pages ..
International Preliminary Report on Patentability for Application No. PCT/EP2016/075735, mailed on Jan. 2, 2018, 8 pages.
International Preliminary Report on Patentability for Application No. PCT/EP2016/075737, mailed on May 11, 2018, 10 pages.
International Preliminary Report on Patentability for Application No. PCT/EP2016/075738, mailed on May 11, 2018, 9 pages.
International Preliminary Report on Patentability for Application No. PCT/EP2017/065906, mailed on Jan. 10, 2019, 9 pages.
International Preliminary Report on Patentability for Application No. PCT/EP2017/065908, mailed on Jan. 10, 2019, 9 pages.
International Preliminary Report on Patentability for Application No. PCT/EP2018/075093, mailed on Mar. 26, 2020, 8 pages.
International Preliminary Report on Patentability for Application No. PCT/EP2016/070190, mailed on Mar. 15, 2018, 12 pages.
International Preliminary Report on Patentability for Application No. PCT/EP2016/075736, mailed on May 11, 2018, 6 pages.
International Preliminary Report on Patentability for Application No. PCT/EP2017/065909, mailed on Jan. 10, 2019, 7 pages.
International Search Report and Written Opinion for Application No. PCT/EP2016/070190, mailed on Mar. 13, 2017, 19 pages.
International Search Report and Written Opinion for Application No. PCT/EP2016/075735, mailed on Feb. 2, 2017, 10 pages.
International Search Report and Written Opinion for Application No. PCT/EP2016/075736, mailed on Feb. 14, 2017, 6 pages.
International Search Report and Written Opinion for Application No. PCT/EP2016/075737, mailed on Jun. 16, 2017, 14 pages.
International Search Report and Written Opinion for Application No. PCT/EP2016/075738, mailed on Mar. 2, 2017, 12 pages.
International Search Report and Written Opinion for Application No. PCT/EP2017/065906, mailed on Oct. 24, 2017, 16 pages.
International Search Report and Written Opinion for Application No. PCT/EP2017/065908, mailed on Oct. 17, 2017, 11 pages.
International Search Report and Written Opinion for Application No. PCT/EP2017/065909, mailed on Oct. 24, 2017, 10 pages.
International Search Report and Written Opinion for Application No. PCT/EP2018/058195, mailed on Nov. 12, 2018, 20 pages.
International Search Report and Written Opinion for Application No. PCT/EP2018/075093, mailed on Jan. 4, 2019, 11 pages.
International Search Report for Application No. PCT/EP2018/083795, mailed Mar. 15, 2019, 3 pages.
Iorga A., et al., "Low Curie Temperature in Fe—Cr—Ni—Mn Alloys," U.P.B. Sci.Bull., Series B, vol. 73 (4), 2011, pp. 195-202.
Neomax Materials Co., Ltd., "NeoMax MS-135," retrieved from http://www.neomax-materials.co.jp/eng/pr0510.htm, as accessed on Oct. 30, 2015, 2 pages.
Notice of Reasons for Refusal Office Action mailed Sep. 8, 2020 for Japanese Application No. 2018-567856, 8 pages.
Notice of Reasons for Rejection Office Action mailed Mar. 17, 2020 for Japanese Application No. 2018-522061, 7 pages.
Office Action and Search Report mailed Apr. 14, 2020 for Chinese Application No. 201680063711.0, 28 pages.
Office Action dated Jun. 25, 2019 for Japanese Application No. 2018-521546, 4 pages.
Office Action For Canadian Application No. 3,056,677, mailed on Nov. 24, 2020, 6 pages.
Office Action For Chinese Application No. 201680072882.X, mailed on Jan. 14, 2021, 12 pages.

(56) References Cited

OTHER PUBLICATIONS

Office Action for Chinese Application No. 201780039879.2 mailed on Sep. 18, 2020, 7 pages.
Office Action mailed Mar. 1, 2019 for Canadian Application No. 2996341, 4 pages.
Office Action mailed Sep. 9, 2020 for Chinese Application No. 201780040874.1, 20 pages.
Office Action mailed Dec. 11, 2019 for Brazilian Application No. BR1120180085138, 6 pages.
Office Action mailed Sep. 15, 2020 for Japanese Application No. 2018-567854, 8 pages.
Office Action mailed Feb. 16, 2021 for Japanese Application No. 2018-567856, 2 pages.
Office Action mailed Aug. 19, 2020 for KR Application No. 20187037693, filed Jun. 27, 2017, 21 pages.
Office Action mailed Mar. 2, 2021 for Japanese Application No. 2018-567947, 4 pages.
Office Action mailed Mar. 22, 2019 for Korean Application No. 10-2018-7012422, 19 pages.
Office Action mailed Mar. 22, 2019 for Korean Application No. 10-2018-7012428, 22 pages.
Office Action mailed Jul. 23, 2019 for Japanese Application No. 2018-521928, 14 pages.
Office Action mailed Jul. 23, 2019 for Japanese Application No. 2018-522061, 9 pages.
Office Action mailed Feb. 25, 2020 for Japanese Application No. 2018-567854, 7 pages.
Office Action mailed Feb. 25, 2020 for Japanese Application No. 2018-567947, 6 pages.
Office Action mailed Feb. 25, 2020 for Japanese Application No. 2018-567856, 6 pages.
Office Action mailed Jun. 25, 2019 for Japanese Application No. 2018-519932, 5 pages.
Office Action mailed Sep. 26, 2019 for Korean Application No. 10-2018-7012353, 15 pages.
Office Action mailed Dec. 27, 2019 for Chinese Application No. 201680049091, 25 pages.
Office Action mailed Mar. 28, 2019 for Canadian Application No. 3003520, , 3 pages.
Office Action mailed Mar. 29, 2019 for Korean Application No. 10-2018-7012366, 6 pages.
Office Action mailed Oct. 29, 2018 for Russian Application No. 2018115542, 9 pages.
Office Action mailed Feb. 4, 2020 for Japanese Application No. 2018-507621, 29 pages.
Office Action mailed Feb. 7, 2019 for Korean Application No. 10-2018- 7006076, 10 pages.
Office Action mailed May 7, 2019 for Japanese Application No. 2018-507621, 8 pages.
Office Action mailed Dec. 9, 2019 for Canadian Application No. 3003521, 6 pages.
Todaka T., et al., "Low Curie Temperature Material for Induction Heating Self-Temperature Controlling System," Journal of Magnetism and Magnetic Materials, vol. 320 (20), Oct. 2008, pp. e702-e707.
Communication pursuant to Article 94(3) EPC for Application No. 16798649.6, mailed on Jul. 5, 2021, 7 pages.
Extended European Search Report for Application No. 20204770.0, mailed on Jun. 30, 2021, 14 pages.
Extended European Search Report for Application No. 20205060.5, mailed on Aug. 6, 2021, 20 pages.
Notice of Reasons for Refusal For Japanese Application No. 2020-528003, mailed on Jul. 20, 2021, 3 pages.
Office Action dated Jun. 1, 2021, for Russian Application No. 2020135859, 12 pages.
Office Action dated Jun. 17, 2021 for Ukraine Application No. 201804590, 3 pages.
Office Action for Canadian Application No. 3,003,519, mailed on Jul. 30, 2021, 4 pages.
Office Action for Japanese Application No. 2020-175420, mailed on Oct. 12, 2021, 9 pages.
Office Action for Japanese Application No. 2020-182740, mailed on Oct. 12, 2021, 10 pages.
Office Action for Japanese Application No. 2020-182750, mailed on Oct. 12, 2021, 8 pages.
Office Action for Korean Application No. 10-2018-7037677, dated May 12, 2021, 4 pages.
Office Action for Malaysian Application No. PI2018002742, dated Apr. 21, 2021, 4 pages.
Office Action for Russian Application No. 2020135808, mailed on Apr. 23, 2021, 12 pages.
Office Action for Russian Application No. 2020135851, mailed on May 24, 2021, 13 pages.
Office Action mailed May 12, 2021 for Chinese Application No. 201780040874.1, 15 pages.
Communication pursuant to Article 94(3) EPC for Application No. 17740628.7 mailed on May 9, 2022, 9 pages.
Communication pursuant to Article 94(3) EPC for Application No. 21213373.0 mailed on May 9, 2022, 6 pages.
Decision to Grant a Patent mailed Mar. 15, 2022 for Japanese Application No. 2020-183062, 5 pages.
European Search Report for Application No. 21213373.0, mailed on Apr. 26, 2022, 7 pages.
Notification of Reason for Refusal mailed Jan. 3, 2022 for Korean Application No. 10-2020-7018918, 12 pages.
Office Action and Search Report for Chinese Application No. 201880059756, mailed Jan. 14, 2022, 11 pages.
Office Action and Search Report for Russian Application No. 2020134245, mailed on Jan. 19, 2022, 27 pages.
Office Action and Search Report mailed Jan. 18, 2022 for Russian Application No. 2020134241, 22 pages.
Office Action for Brazilian Application No. 112018077348-4, mailed on Sep. 27, 2021, 4 pages.
Office Action for Chinese Application No. 201680072882. X, mailed on Sep. 1, 2021, 17 pages.
Office Action for Chinese Application No. 201780040300.4, mailed on Nov. 15, 2021, 14 pages.
Office Action for Japanese Application No. 2020-183062, mailed on Nov. 30, 2021, 6 pages.
Office Action for Japanese Application No. 2020-191836, mailed on Oct. 26, 2021, 8 pages.
Office Action for Japanese Application No. 2020-191838, mailed on Oct. 26, 2021, 8 pages.
Office Action for Japanese Application No. 2022-010005, mailed on Mar. 15, 2022, 3 pages.
Office Action for Korean Application No. 10-2021-7018056, mailed on Oct. 27, 2021, 21 pages.
Office Action for Korean Application No. 10-2021-7023346, mailed on Dec. 14, 2021, 40 pages.
Office Action for Ukraine Application No. a201813017, mailed May 6, 2022, 3 pages.
Communication pursuant to Article 94(3) EPC for Application No. 17740631.1 mailed on Oct. 18, 2022, 6 pages.
Office Action for Chinese Application No. 201780040300.4, mailed on Apr. 26, 2022, 9 pages.
Office Action for Japanese Application No. 2020-191838, mailed on Jul. 5, 2022, 6 pages.
Office Action for Korean Application No. 10-2020-7011369, mailed May 10, 2022, 18 pages.
Office action for Korean Application No. 10-2020-7018918, mailed on Jul. 27, 2022, 6 pages.
Office Action mailed Jun. 22, 2022 for Russian Application No. 2019107295, 8 pages.
Blandino , et al., "Application and File History for U.S. Appl. No. 14/927,532, filed Oct. 30, 2015".
Blandino , et al., "Application and File History for U.S. Appl. No. 14/927,539, filed Oct. 30, 2015".
Blandino , et al., "Application and File History for U.S. Appl. No. 14/927,551, filed Oct. 30, 2015".
Blandino , et al., "Application and File History for U.S. Appl. No. 14/927,556, filed Oct. 30, 2015".

(56) References Cited

OTHER PUBLICATIONS

Blandino, Thomas P., "Application and File History for U.S. Appl. No. 15/772,394, filed Apr. 30, 2018".

Blandino, et al., "Application and File History for U.S. Appl. No. 16/946,043, filed Jun. 3, 2020".

Kaufman, et al., "Application and File History for U.S. Appl. No. 14/840,897, filed Aug. 31, 2015".

Kaufman, et al., "Application and File History for U.S. Appl. No. 14/927,529, filed Oct. 30, 2015".

Kaufman, et al., "Application and File History for U.S. Appl. No. 14/927,537, filed Oct. 30, 2015".

Kaufman, Duane A, "Application and File History for U.S. Appl. No. 15/772,391, filed Apr. 30, 2018".

Decision of Refusal received for Japanese Patent Application No. 2020-191838, mailed on Feb. 28, 2023, 6 pages (3 pages of English Translation and 3 pages of Official Copy).

Extended Search Report received for European Patent Application No. 22166210.9, mailed on Oct. 31, 2022, 11 pages.

International Preliminary Report on Patentability received for PCT Patent Application No. PCT/EP2018/083795, mailed on Jun. 18, 2020, 8 pages.

International Preliminary Report on Patentability received for PCT Patent Application No. PCT/EP2021/075735, mailed on Apr. 13, 2023, 11 pages.

International Search Report and Written Opinion received for PCT Patent Application No. PCT/EP2021/075735, mailed on Jan. 5, 2022, 17 pages.

Notice of Reasons for Refusal received for Japanese Patent Application No. 2022-011143, mailed on Mar. 28, 2023, 12 pages (6 pages of English Translation and 6 pages of Official Copy).

Notice of Reasons for Refusal received for Japanese Patent Application No. 2022-048457, mailed on Jan. 31, 2023, 15 pages (8 pages of English Translation and 7 pages of Official Copy).

Office action for Brazilian Application No. 112020005010-5, mailed on Jul. 21, 2022, 4 pages (Official Copy Only).

Office Action for Chinese Application No. 201880059756.X, mailed Sep. 23, 2022, 6 pages (Official Copy Only).

Office action for Korean Application No. 10-2020-7007392, mailed Sep. 26, 2022, 15 pages (8 pages of English Translation and 7 pages of Official Copy).

Office Action received for Australian Patent Application No. 2022200981, mailed on Dec. 15, 2022, 3 pages.

Office Action received for Brazilian Patent Application No. 112018077348-4, mailed on Oct. 25, 2022, 1 page (Official Copy Only).

Office Action received for Brazilian Patent Application No. 112018077348-4, mailed on Sep. 2, 2022, 5 pages (Official Copy Only).

Office Action received for Brazilian Patent Application No. 122022011678-7, mailed on Mar. 7, 2023, 10 pages (Official Copy Only).

Office Action received for European Patent Application No. 16798649.6, mailed on Jan. 3, 2022, 7 pages.

Office Action received for European Patent Application No. 16798649.6, mailed on May 25. 2022, 5 pages.

Office Action received for European Patent Application No. 16798650.4, mailed on Mar. 6, 2020, 4 pages.

Office Action received for Korean Patent Application No. 10-2022-7025860, mailed on Feb. 15, 2023, 18 pages (10 pages of English Translation and 8 pages of Official Copy).

Result of Consultation received for European Patent Application No. 16798650.4, mailed on Feb. 8, 2022, 4 pages.

Extended European Search Report for Application No. 20205060.5, mailed on Mar. 2, 2021, 19 pages.

Notice of Opposition mailed Jun. 3, 2020 for European Application No. 16766494.5, 37 pages.

Office Action for Japanese Application No. 2020-093539, mailed on Apr. 6, 2021, 6 pages.

Office Action for Korean Application No. 10-2018-7037677, mailed on Mar. 29, 2021, 6 pages.

Office Action mailed May 12, 2021 for Korean Application No. 10-2018-7037693, 7 pages.

Office Action mailed Apr. 29, 2021, for Malaysian Application No. PI2018701525, 3 pages.

\* cited by examiner

ARTICLE FOR USE WITH APPARATUS FOR HEATING SMOKABLE MATERIAL

PRIORITY CLAIM

This application is a continuation of application Ser. No. 15/772,394 filed Apr. 30, 2018, which in turn is a National Phase entry of PCT Application No. PCT/EP2016/075737, filed Oct. 26, 2016, which claims priority from U.S. patent application Ser. No. 14/927,539, filed Oct. 30, 2015, each of which is hereby fully incorporated herein by reference.

TECHNICAL FIELD

The present disclosure relates to articles for use with apparatus for heating smokable material to volatilize at least one component of the smokable material, and to systems comprising such apparatus and such articles.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

A first aspect of the present disclosure provides an article for use with apparatus for heating smokable material to volatilize at least one component of the smokable material, the article comprising: a sheet comprising smokable material; and heating material that is heatable by penetration with a varying magnetic field to heat the smokable material.

In an exemplary embodiment, the heating material is in contact with the sheet.

In an exemplary embodiment, the heating material is on a surface of the sheet.

In an exemplary embodiment, the heating material is embedded within the sheet.

In an exemplary embodiment, the smokable material comprises reconstituted smokable material.

In an exemplary embodiment, the sheet consists entirely or substantially entirely of the reconstituted smokable material.

In an exemplary embodiment, the sheet is planar or substantially planar.

In an exemplary embodiment, the sheet is a rolled sheet.

In an exemplary embodiment, an axial length of the rolled sheet is greater than a diameter of the rolled sheet.

In an exemplary embodiment, the article comprises at least one connector comprising heating material that is heatable by penetration with a varying magnetic field, wherein the rolled sheet is elongate in an axial direction, and wherein the, or each, connector is located at a longitudinal end of the rolled sheet so that the heating material of the, or each, connector contacts the heating material that is heatable by penetration with a varying magnetic field to heat the smokable material.

In an exemplary embodiment, the article comprises a mass of smokable material discrete from, and encircled by, the rolled sheet.

In an exemplary embodiment, the article comprises adhesive adhering two portions of the rolled sheet to each other.

In an exemplary embodiment, all or substantially all of a surface of the sheet is covered by the heating material.

In an exemplary embodiment, a surface of the sheet is only partially covered by the heating material.

In an exemplary embodiment, the article comprises a plurality of discrete bodies on a surface of the sheet, wherein each of the discrete bodies comprises the heating material.

In an exemplary embodiment, each of the discrete bodies comprises a tube comprising the heating material. In an exemplary embodiment, each of the tubes is a carbon tube.

In an exemplary embodiment, each of the discrete bodies comprises a strip or track comprising the heating material.

In an exemplary embodiment, the heating material is in the form of at least one spiral.

In an exemplary embodiment, the heating material is in the form of at least one closed circuit.

In an exemplary embodiment, the article comprises ink on the sheet, wherein the ink comprises the heating material.

In an exemplary embodiment, the heating material comprises one or more materials selected from the group consisting of: an electrically-conductive material, a magnetic material, and a magnetic electrically-conductive material.

In an exemplary embodiment, the heating material comprises a metal or a metal alloy.

In an exemplary embodiment, the heating material comprises one or more materials selected from the group consisting of: aluminum, gold, iron, nickel, cobalt, conductive carbon, graphite, plain-carbon steel, stainless steel, ferritic stainless steel, copper, and bronze.

In an exemplary embodiment, the heating material is in contact with the smokable material.

In an exemplary embodiment, the smokable material comprises tobacco and/or one or more humectants.

A second aspect of the present disclosure provides an article for use with apparatus for heating smokable material to volatilize at least one component of the smokable material, the article comprising: a sheet comprising smokable material; and an adhesive surface for adhering the sheet to a carrier.

In an exemplary embodiment, the adhesive surface comprises adhesive on a surface of the sheet.

In an exemplary embodiment, the adhesive surface is a surface of the sheet.

In an exemplary embodiment, the sheet is a rolled sheet.

In an exemplary embodiment, the smokable material comprises reconstituted smokable material.

In an exemplary embodiment, the sheet consists entirely or substantially entirely of the reconstituted smokable material.

In an exemplary embodiment, the article comprises a backing sheet, wherein the adhesive surface is in contact with the backing sheet.

In an exemplary embodiment, the backing sheet is removable from the adhesive surface to expose the adhesive surface.

In an exemplary embodiment, the backing sheet comprises glass fibers and/or carbon fibers.

A third aspect of the present disclosure provides a system, comprising: apparatus for heating smokable material to volatilize at least one component of the smokable material; and an article for use with the apparatus, the article comprising a sheet comprising smokable material, and heating material that is heatable by penetration with a varying magnetic field to heat the smokable material; wherein the apparatus comprises a heating zone for receiving at least a portion of the article, and a magnetic field generator for generating a varying magnetic field to be used in heating the smokable material when the portion of the article is in the heating zone.

In an exemplary embodiment, the smokable material comprises reconstituted smokable material.

In an exemplary embodiment, the apparatus comprises heating material that is heatable by penetration with the varying magnetic field to heat the smokable material when the portion of the article is in the heating zone.

In an exemplary embodiment, the article of the system is the article of the first aspect of the present disclosure. The article of the system may have any one or more of the features discussed above as being present in respective exemplary embodiments of the article of the first aspect of the present disclosure.

In an exemplary embodiment, the article of the system is the article of the second aspect of the present disclosure. The article of the system may have any one or more of the features discussed above as being present in respective exemplary embodiments of the article of the second aspect of the present disclosure.

BRIEF DESCRIPTION OF THE DRAWINGS

Embodiments of the disclosure will now be described, by way of example only, with reference to the accompanying drawings, in which.

DETAILED DESCRIPTION

Figure 1:
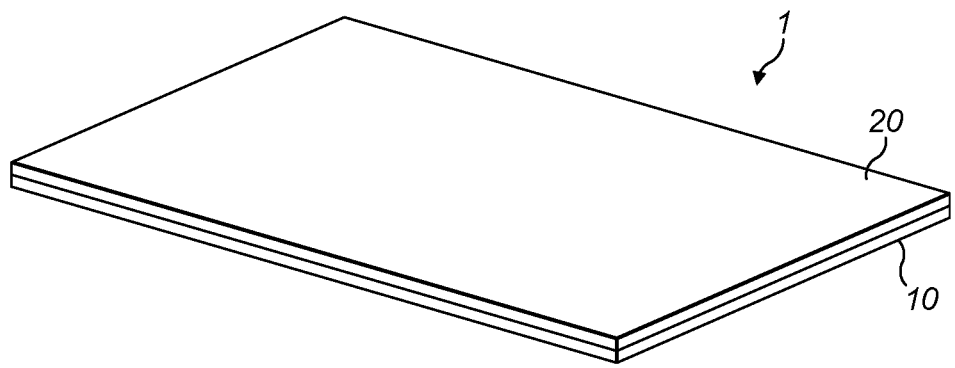
FIG. 1 shows a schematic perspective view of an example of an article for use with apparatus for heating smokable material to volatilize at least one component of the smokable material.

As used herein, the term "smokable material" includes materials that provide volatilized components upon heating, typically in the form of vapor or an aerosol. "Smokable material" may be a non-tobacco-containing material or a tobacco-containing material. "Smokable material" may, for example, include one or more of tobacco per se, tobacco derivatives, expanded tobacco, reconstituted tobacco, tobacco extract, homogenized tobacco or tobacco substitutes. The smokable material can be in the form of ground tobacco, cut rag tobacco, extruded tobacco, reconstituted tobacco, reconstituted smokable material, liquid, gel, gelled sheet, powder, or agglomerates, or the like. "Smokable material" also may include other, non-tobacco, products, which, depending on the product, may or may not contain nicotine. "Smokable material" may comprise one or more humectants, such as glycerol or propylene glycol.

As used herein, the term "heating material" or "heater material" refers to material that is heatable by penetration with a varying magnetic field.

As used herein, the term "reconstituted smokable material" refers to reconstituted tobacco (sometimes itself referred to as tobacco "recon"), such as reconstituted tobacco sheet, or other reconstituted smokable material. The reconstituted smokable material may comprise a plurality of different types of tobacco or other smokable material, which may have been selected to improve the transmission of tobacco tastes and flavors to a user in use. For example, the reconstituted smokable material may comprise one or more of sun-cured tobacco, dark air-cured tobacco, fire-cured tobacco or any other suitable tobacco type. The reconstituted smokable material may be produced by subjecting smokable material to one or more processes comprising drying the smokable material, milling the dried smokable material to a particle size suitable for making a sheet, optionally adding fiber, a binding agent and/or a humectant, and/or forming the resultant product into a reconstituted sheet. In some embodiments, the reconstituted smokable material may be produced by subjecting smokable material to one or more processes comprising mixing the smokable material with a solvent such as an aqueous solvent, separating a soluble portion of the smokable material from an insoluble portion, mechanically refining the insoluble portion to produce a pulp, forming the sheet into a pulp, removing excess liquid from the pulp, concentrating the soluble portion such as by evaporation, recombining the concentrated solubles with the sheet, and then drying the resultant product.

As used herein, the terms "flavor" and "flavorant" refer to materials which, where local regulations permit, may be used to create a desired taste or aroma in a product for adult consumers. They may include extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, gel, powder, or the like.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Figure 9:
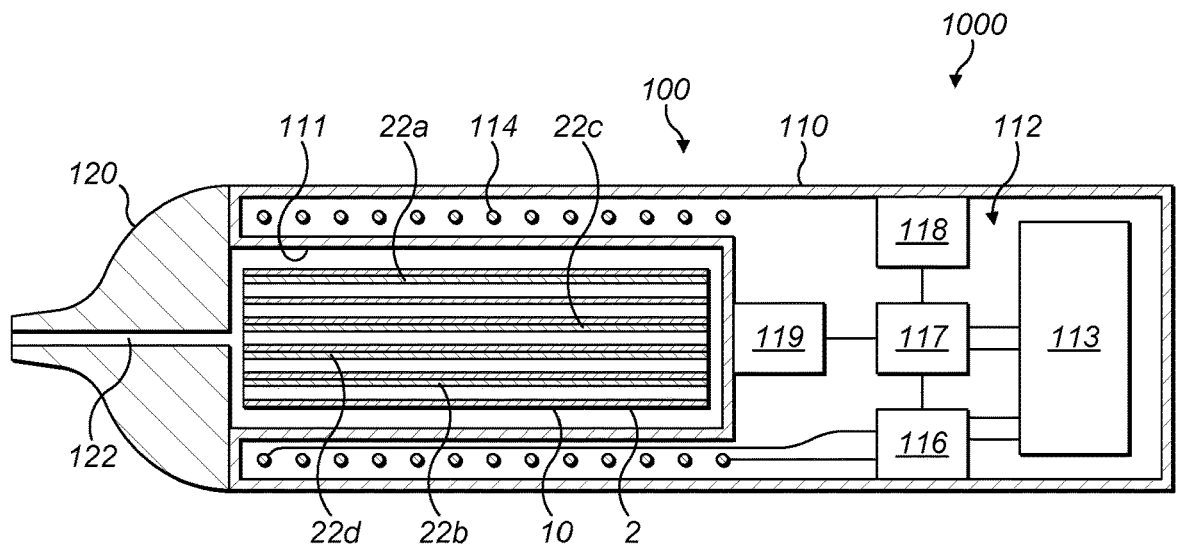
FIG. 9 shows a schematic cross-sectional view of an example of a system comprising the article of FIG. 2 and apparatus for the heating smokable material of the article to volatilize at least one component of the smokable material.

Referring to FIG. 1 there is shown a schematic perspective view of an example of an article according to an embodiment of the disclosure. The article 1 comprises a sheet 10 comprising reconstituted smokable material, and heating material 20 that is heatable by penetration with a varying magnetic field to heat the smokable material. Examples of such heating material are described below. The article 1 is for use with apparatus for heating the smokable material to volatilize at least one component of the smokable material without burning the smokable material. Such an apparatus may comprise a magnetic field generator for generating a varying magnetic field to be used in heating the heating material. An example such apparatus 100 is shown in FIG. 9 and described below.

In this embodiment, the sheet 10 is planar, or substantially planar. However, the sheet 10 is bendable or rollable so as to from a rolled sheet. By "rolled sheet", it is meant that the sheet 10 is curved, such as without folding, so that the sheet 10 has an elongate spiral or tubular shape. Such a rolled sheet may be less prone to damage, more convenient to store and handle, and better suited for use with the apparatus than the planar sheet.

In this embodiment, the heating material 20 is in contact with the sheet 10. More specifically, in this embodiment, the heating material 20 is on a surface of the sheet 10. Still more specifically, in this embodiment, all or substantially all of a surface of the sheet 10 is covered by a layer that comprises the heating material 20. The layer may be a foil layer. However, as will be apparent from the description below, in other embodiments the surface of the sheet 100 may be only partially covered by the heating material 20. Further, in some embodiments, the heating material 20 may be on both opposite surfaces of the sheet 10. For example, in some embodiments, all, substantially all, a majority, or only a portion of each of two opposite surfaces of the sheet 10 may be covered by heating material 20.

Figure 2:
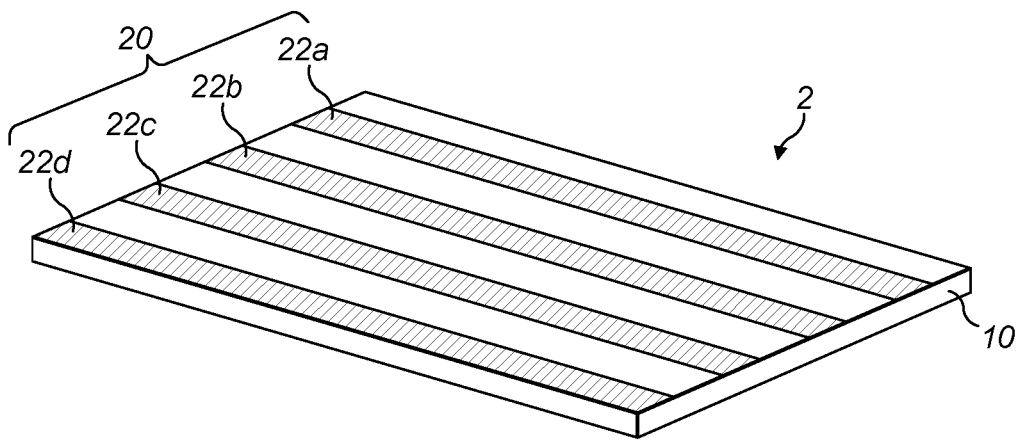
FIG. 2 shows a schematic perspective view of an example of another article for use with apparatus for heating smokable material to volatilize at least one component of the smokable material.

Referring to FIG. 2 there is shown a schematic perspective view of an example of another article according to an embodiment of the disclosure. The article 2 of FIG. 2 is identical to the article 1 described above with reference to FIG. 1, other than the manner in which heating material is provided in the article 2. Any of the herein-described possible variations to the article 1 of FIG. 1 may be made to the article 2 of FIG. 2 to form separate respective embodiments.

In this embodiment, the heating material 20 again is on a surface of the sheet 10 comprising reconstituted smokable material. However, in this embodiment, the article 2 comprises a plurality of discrete bodies 22a, 22b, 22c, 22d on a surface of the sheet 10, and each of the discrete bodies 22a, 22b, 22c, 22d comprises the heating material 20. In this embodiment, each of the discrete bodies 22a, 22b, 22c, 22d comprises a strip or track 22a, 22b, 22c, 22d on a surface of the surface of the sheet 10.

In this embodiment, the strips 22a, 22b, 22c, 22d are parallel to each other, but in other embodiments this may not be the case. Further, in this embodiment, the strips 22a, 22b, 22c, 22d are all on one surface of the sheet 10, but in other embodiments there may be one or more such strips on both opposite surfaces of the sheet 10. In some embodiments, there may be only one such strip 22a, 22b, 22c, 22d on a surface of the sheet 10.

In this embodiment, the strips 22a, 22b, 22c, 22d are linear. In other embodiments, some or all of the strips 22a, 22b, 22c, 22d may be non-linear, such as curved or wavy.

In this embodiment, the strips 22a, 22b, 22c, 22d are of substantially equal width in a direction perpendicular to their respective elongate dimensions, and substantially equal thicknesses in a direction normal to the surface on which they are provided. In other embodiments, the strips 22a, 22b, 22c, 22d may be of different respective widths and/or thicknesses. Regions of the smokable material adjacent the wider or thicker tracks may then be heated to a lesser degree by the application of a given varying magnetic field than regions of the smokable material adjacent the narrower tracks. Moreover, in some embodiments, the width and/or thickness of one or more of the strips 22a, 22b, 22c, 22d may vary along the path the strip follows. Therefore, in some embodiments, one or more portions of the heating material 20 is/are able to heat first region(s) of the smokable material relatively quickly to initialize volatilization of at least one component of the smokable material and formation of vapor in the first region(s) of the smokable material, and one or more portions of the heating material 20 is/are able to heat second region(s) of the smokable material relatively slowly to initialize volatilization of at least one component of the smokable material and formation of vapor in the second region(s) of the smokable material. Accordingly, vapor is able to be formed relatively rapidly for inhalation by a user, and vapor can continue to be formed thereafter for subsequent inhalation by the user even after the first region(s) of the smokable material may have ceased generating vapor. A given region of the smokable material may cease generating the vapor when the region becomes exhausted of volatilizable components of the smokable material.

In each of the embodiments discussed herein, the heating material 20 may have a skin depth, which is an exterior zone within which most of an induced electrical current and/or induced reorientation of magnetic dipoles occurs. By providing that the component comprising the heating material 20 has a relatively small thickness, a greater proportion of the heating material 20 may be heatable by a given varying magnetic field, as compared to heating material in a component having a depth or thickness that is relatively large as compared to the other dimensions of the component. Thus, a more efficient use of material is achieved. In turn, costs are reduced.

In some embodiments, the strip or strips 22a, 22b, 22c, 22d is/are in the form ink comprising the heating material 20. During manufacture, the ink may be printed on the sheet 10, for example using gravure printing. Ink may have a small thickness. Therefore, induced electrical current and/or induced reorientation of magnetic dipoles in the ink when subjected to a varying magnetic field may penetrate most or all of the ink, rather than be confined to just a "skin" thereof as can be the case when a component comprising heating material has too great a thickness. Thus, a more efficient use of material is achieved and, in turn, costs are reduced. In other embodiments, the strip or strips 22a, 22b, 22c, 22d may be adhered or otherwise provided on the surface of the sheet 10 in a different manner.

Figure 3:
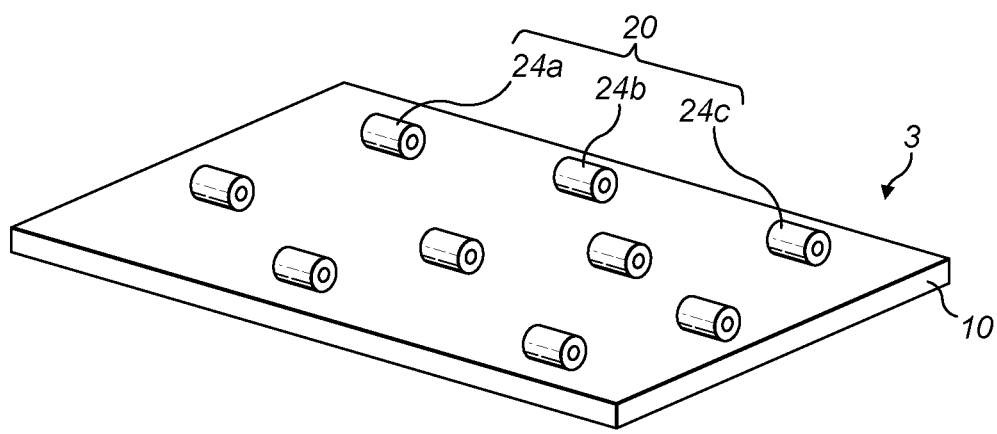
FIG. 3 shows a schematic perspective view of an example of another article for use with apparatus for heating smokable material to volatilize at least one component of the smokable material.

Referring to FIG. 3 there is shown a schematic perspective view of an example of another article according to an embodiment of the disclosure. The article 3 of FIG. 3 is identical to the article 2 described above with reference to FIG. 2, other than the manner in which heating material is provided in the article 3. Any of the herein-described possible variations to the article 2 of FIG. 2 may be made to the article 3 of FIG. 3 to form separate respective embodiments.

In this embodiment, the article 3 again comprises a plurality of discrete bodies 24a, 24b, 24c on a surface of the sheet 10, and each of the discrete bodies 24a, 24b, 24c again comprises the heating material 20. However, in this embodiment, each of the discrete bodies 24a, 24b, 24c comprises a tube 24a, 24b, 24c on a surface of the sheet 10. The tubes 24a, 24b, 24c may be affixed to the surface of the sheet 10 by an adhesive or the like. In this embodiment, the tubes 24a, 24b, 24c are aligned axially parallel to each other. In some embodiments, the tubes 24a, 24b, 24c are aligned magnetically with each other. That is, magnetic dipoles within the tubes 24a, 24b, 24c are aligned magnetically with each other. It has been found that, when the tubes 24a, 24b, 24c are aligned magnetically with each other, magnetic coupling between the tubes 24a, 24b, 24c and an electromagnet of the apparatus may be enhanced in use, which results in greater or improved Joule heating of the tubes 24a, 24b, 24c, and thus greater or improved heating of the smokable material. In other embodiments, the tubes 24a, 24b, 24c may be aligned at different relative orientations.

In this embodiment, the tubes 24a, 24b, 24c are all on one surface of the sheet 10. In other embodiments there may be one or more such tubes 24a, 24b, 24c on both opposite surfaces of the sheet 10. In some embodiments, there may be only one such tube 24a, 24b, 24c on a surface of the sheet 10.

In some embodiments, the, or each, tube 24a, 24b, 24c may be a carbon tube. In some embodiments, the, or each, tube 24a, 24b, 24c may have an outer diameter that is within the range of 0.05 to 2.0 millimeters, or within the range of 0.1 to 1.0 millimeters, such as approximately 0.5 millimeters.

In this embodiment, each of the tubes 24a, 24b, 24c comprises a closed circuit of heating material that is heatable by penetration with a varying magnetic field. In some embodiments, this can result in magnetic coupling between the tubes 24a, 24b, 24c and an electromagnet of the apparatus in use being enhanced, which results in greater or improved Joule heating.

A tubular element can have a small cross-sectional area to diameter ratio. Therefore, the circulating current in the tube when subjected to a varying magnetic field may penetrate most or all of the tube, rather than be confined to just a "skin" thereof as can be the case when a component comprising heating material has too greater a thickness. Thus, a more efficient use of material is achieved and, in turn, costs are reduced.

In this embodiment, each of the tubes 24a, 24b, 24c consists entirely, or substantially entirely, of the heating material. However, in other embodiments, one or more of the tubes 24a, 24b, 24c may comprise a carrier that is free of heating material and that carries the heating material. For example, one or more of the tubes 24a, 24b, 24c may comprise a tubular carrier free of heating material with a closed-circuit of the heating material coated thereon.

In some variations to this embodiment, some or all of the tubes 24a, 24b, 24c may be replaced with a loop-shaped or ring-shaped element comprising a closed circuit of heating material, or a carrier that is free of heating material and that carries the closed circuit of heating material. A loop-shaped element may be of any shape that defines a path that starts and ends at the same point so as to create a closed circuit, whereas a ring-shaped element necessarily is circular or substantially circular.

Figure 4:
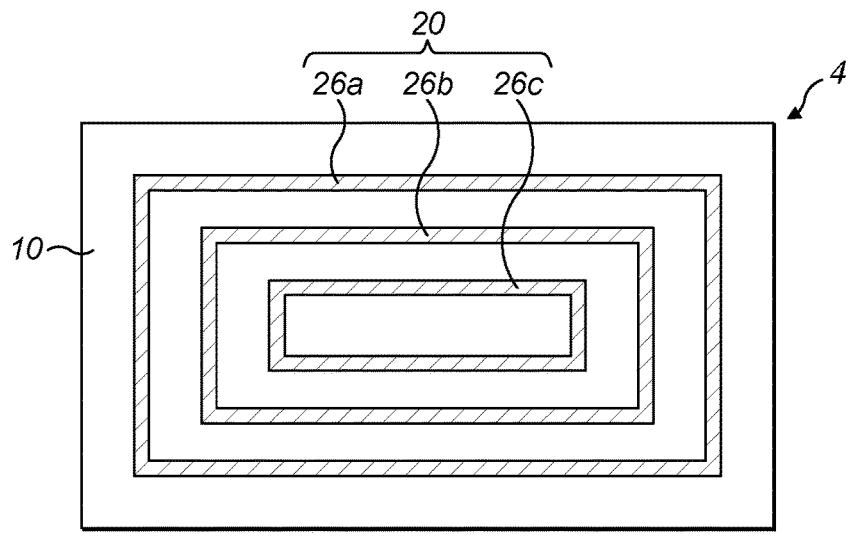
FIG. 4 shows a schematic front view of an example of another article for use with apparatus for heating smokable material to volatilize at least one component of the smokable material.

Referring to FIG. 4 there is shown a schematic perspective view of an example of another article according to an embodiment of the disclosure. The article 4 of FIG. 4 is identical to the article 2 described above with reference to FIG. 2, other than the manner in which heating material is provided in the article 4. Any of the herein-described possible variations to the article 2 of FIG. 2 may be made to the article 4 of FIG. 4 to form separate respective embodiments.

In this embodiment, the article 4 again comprises a plurality of discrete bodies 26a, 26b, 26c on a surface of the sheet 10, and each of the discrete bodies 26a, 26b, 26c again comprises the heating material 20. However, in this embodiment, each of the discrete bodies 26a, 26b, 26c comprises a closed circuit 26a, 26b, 26c of the heating material 20. Again, in some embodiments, such a closed circuit of heating material can result in magnetic coupling between the closed circuit(s) 26a, 26b, 26c and an electromagnet of the apparatus in use being enhanced, which results in greater or improved Joule heating.

In this embodiment, the closed circuits 26a, 26b, 26c are arranged concentrically with one another. This can make efficient use of the space on the sheet 10. In other embodiments, the closed circuits 26a, 26b, 26c are arranged non-concentrically with one another. For example, in some embodiments the closed circuits 26a, 26b, 26c may be arranged so that each of the closed circuits 26a, 26b, 26c is outside of each other of the closed circuits 26a, 26b, 26c.

Further, in this embodiment, the closed circuits 26a, 26b, 26c are all on one surface of the sheet 10, but in other embodiments there may be one or more such closed circuits 26a, 26b, 26c on both opposite surfaces of the sheet 10. In some embodiments, there may be only one such closed circuit 26a, 26b, 26c on a surface of the sheet 10.

In some embodiments, the closed circuit(s) 26a, 26b, 26c is/are in the form ink comprising the heating material 20. The ink may be printed on the sheet 10, for example using gravure printing. In other embodiments, the closed circuit(s) 26a, 26b, 26c may be adhered or otherwise provided on a surface of the sheet 10 in a different manner.

Figure 5:
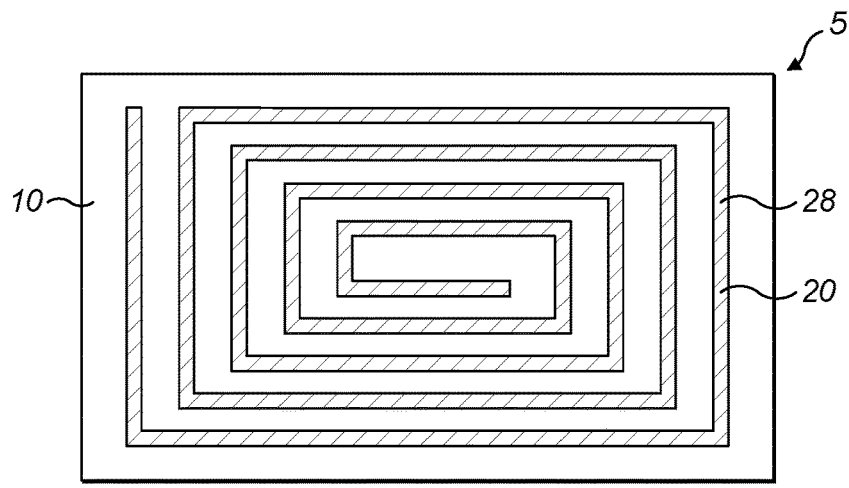
FIG. 5 shows a schematic front view of an example of another article for use with apparatus for heating smokable material to volatilize at least one component of the smokable material.

Referring to FIG. 5 there is shown a schematic perspective view of an example of another article according to an embodiment of the disclosure. The article 5 of FIG. 5 is identical to the article 4 described above with reference to FIG. 4, other than the manner in which heating material is provided in the article 5. Any of the herein-described possible variations to the article 4 of FIG. 4 may be made to the article 5 of FIG. 5 to form separate respective embodiments.

In this embodiment, the article 5 comprises a spiral 28 of the heating material 20 on a surface of the sheet 10. In some embodiments, more than one such spiral 28 may be provided on the surface of the sheet 10. In this embodiment the spiral 28 covers a majority of a surface of the sheet 10. In some embodiments there may be one or more such spirals 28 on both opposite surfaces of the sheet 10.

In some embodiments, the spiral(s) 28 is/are in the form ink comprising the heating material 20. The ink may be printed on the sheet 10, for example using gravure printing. In other embodiments, the spiral(s) 28 may be adhered or otherwise provided on a surface of the sheet 10 in a different manner.

In each of the above-described embodiments, the sheet 10 is planar, or substantially planar. However, in some embodiments, the sheet 10 may be bendable or rollable so as to from a rolled sheet. Such a rolled sheet may be less prone to damage, more convenient to store and handle, and better suited for use with the apparatus.

In some embodiments the articles 1, 2, 3, 4, 5 may be provided to a user in the respective states shown in FIGS. 1 to 5. In other embodiments, the respective articles 1, 2, 3, 4, 5 may be provided to a user with the sheet 10 in the form of a rolled sheet 10. In some such embodiments, an axial length of the rolled sheet 10 may be greater than a diameter (or width perpendicular to the axial length) of the rolled sheet 10. The article 1, 2, 3, 4, 5 may have overall proportions approximating those of a cigarette. In some embodiments, the sheet 10 may be rolled so that the sheet 10 defines an outer surface of the article 1, 2, 3, 4, 5, which may contact the apparatus in use. In some embodiments, the sheet 10 may be rolled so that the sheet 10 lies between the heating material and an exterior of the article 1, 2, 3, 4, 5. In some embodiments, the article may comprise an adhesive (not shown) that adheres overlapped portions of the sheet 10 to each other to help prevent the rolled sheet 10 from unraveling. The adhesive may comprise one or more of, for example, gum Arabic, natural or synthetic resins, starches, hydroxyl propyl methyl cellulose, and varnish. In other embodiments, the adhesive may be omitted.

Figure 6:
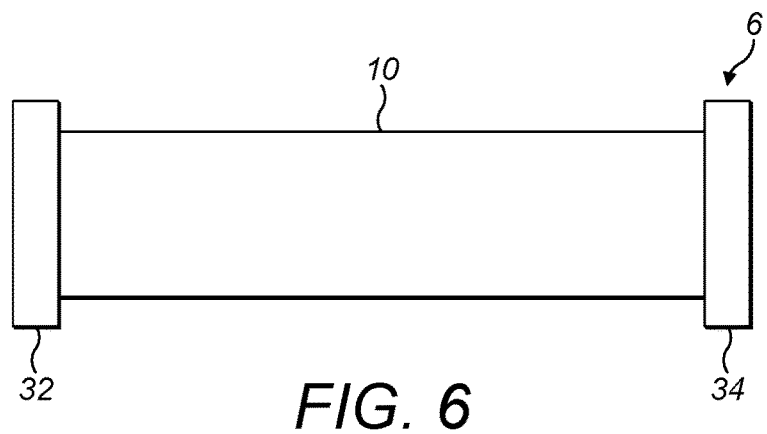
FIG. 6 shows a schematic side view of an example of another article for use with apparatus for heating smokable material to volatilize at least one component of the smokable material.

Referring to FIG. 6 there is shown a schematic perspective view of an example of another article according to an embodiment of the disclosure. The article 6 of FIG. 6 comprises a rolled sheet 10, which is formed from the sheet 10 of the article 1 described above with reference to FIG. 1. Any of the herein-described possible variations to the article 1 of FIG. 1 may be made to the article 6 of FIG. 6 to form separate respective embodiments. Further, the rolled sheet 10 of the article 6 of FIG. 6 may be replaced by a rolled version of the sheet 10 of any of the other embodiments described herein to form separate respective embodiments.

In this embodiment, the article 6 is elongate and cylindrical with a substantially circular cross section. The rolled sheet 10 of the article 6 has an axial length that is greater than a diameter (or width perpendicular to the axial length) of the rolled sheet 10. The sheet 10 is arranged so that the sheet 10 lies between the heating material and an exterior of the article 6. This helps to retain heat that is generated in the heating material 20 within the article 6. In some embodiments, the article 6 may comprise an adhesive (not shown) that adheres overlapped portions of the sheet 10 to each other to help prevent the rolled sheet 10 from unraveling. The adhesive may comprise one or more of the possible adhesives discussed above, but in other embodiments such adhesive may be omitted.

The article 6 comprises two connectors 32, 34, which are located at opposite longitudinal ends of the rolled sheet 10. In this embodiment, each of the connectors 32, 34 comprises a carrier and one or more bodies of heating material on the carrier. In this embodiment, the carrier is made from paper, but in other embodiments the carrier may be made of a material other than paper, such as an alternative electrically-insulating material. In other embodiments, one or each of the connectors 32, 34 may instead consist entirely or substantially entirely of heating material.

In this embodiment, the connectors 32, 34 are adhered to the sheet 10 by an adhesive (not shown), which may comprise one or more of the possible adhesives discussed above, but in other embodiments such adhesive may be omitted. In this embodiment, the combination of the sheet 10 and the connectors 32, 34 defines an outer surface of the article 6, which may contact the apparatus in use.

In this embodiment, the connectors 32, 34 abut respective longitudinal ends of the sheet 10 of reconstituted smokable material, so as to form respective longitudinal ends of the article 6. In this embodiment, the connectors 32, 34 are arranged so that the heating material of the connectors 32, 34 contacts the heating material 20 that is heatable to heat the smokable material. As the heating material 20 on the surface of the sheet 10 of reconstituted smokable material is in the shape of an elongate spiral, the heating material of the connectors 32, 34 acts to connect otherwise spaced-apart portions of the heating material 20 on the surface of the sheet 10, so as to define one or more closed circuits of heating material. As noted elsewhere herein, the provision of a closed circuit of heating material can result in magnetic coupling between the closed circuit and an electromagnet of the apparatus in use being enhanced, which results in greater or improved Joule heating.

In a variation to the illustrated embodiment, the article 6 may be formed from the article 2 of FIG. 2, for example. That is, the sheet 10 of the article 2 of FIG. 2 may be rolled and then the connectors 32, 34 attached to opposite longitudinal ends of the rolled sheet 10. The strips 22a, 22b, 22c, 22d comprising heating material may be arranged so as to be parallel to the longitudinal axis of the rolled sheet 10. The connectors 32, 34 may be arranged so that the heating material of the connectors 32, 34 contacts the strips 22a, 22b, 22c, 22d of heating material 20 so as to define one or more closed circuits of heating material.

In some embodiments, the heating material 20 may be U-shaped, with the free ends of the arms of the U located at one longitudinal end of the article 6 and the base of the U located away from that longitudinal end of the article 6. In such a variation, only one of the connectors 32, 34 need be provided at that one longitudinal end of the article 6 to create one or more closed circuits comprising the heating material 20 and the heating material of the one connector 32, 34.

In some embodiments, the connector(s) 32, 34 may be movable or rotatable relative to the heating material 20. Such rotation may enable the number of connections between portions of the heating material 20 made by the connector(s) 32, 34 to be changed, thereby to vary the amount of heating material present in a circuit or circuits. This may vary the intensity of heating provided to the smokable material. In some embodiments, the heating material 20 on the surface of the sheet 10 may comprise strips or tracks of different thicknesses and/or widths, so that different heating profiles may be created by rotating the connector(s) 32, 34 to different rotational positions relative to the tracks.

Figure 7:
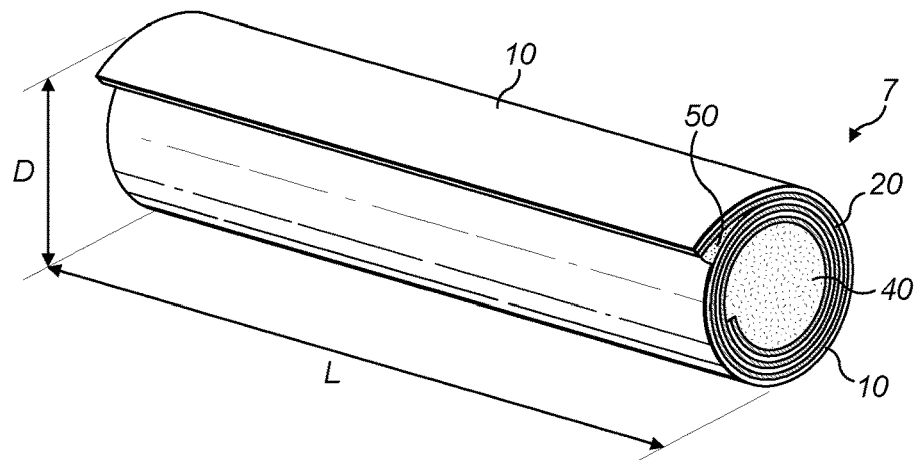
FIG. 7 shows a schematic perspective view of an example of another article for use with apparatus for heating smokable material to volatilize at least one component of the smokable material.

Referring to FIG. 7 there is shown a schematic perspective view of an example of another article according to an embodiment of the disclosure. The article 7 of FIG. 7 comprises a rolled sheet 10, which is formed from the sheet 10 of the article 1 described above with reference to FIG. 1. Any of the herein-described possible variations to the article 1 of FIG. 1 may be made to the article 7 of FIG. 7 to form separate respective embodiments. Further, the rolled sheet 10 of the article 7 of FIG. 7 may be replaced by a rolled version of the sheet 10 of any of the other embodiments described herein to form separate respective embodiments.

In this embodiment, the article 7 is elongate and cylindrical with a substantially circular cross section. The rolled sheet 10 of the article 7 has an axial length L that is greater than a diameter (or width perpendicular to the axial length) D of the rolled sheet 10.

In this embodiment, the article 7 comprises an adhesive 50 that adheres overlapped portions of the sheet 10 to each other to help prevent the rolled sheet 10 from unraveling. The adhesive 50 may comprise one or more of the possible adhesives discussed above, but in other embodiments such adhesive may be omitted. It is to be noted that the size of the adhesive 50 relative to the rest of the article 7 is accentuated in FIG. 7 for clarity.

The article 7 of this embodiment also comprises a mass of smokable material 40 that is discrete from, and encircled by, the rolled sheet 10. The sheet 10 is arranged so that the sheet 10 lies between the heating material and an exterior of the article 7, and so that the heating material is closer to the mass of smokable material 40. This helps to retain within the article 7 heat that is generated in the heating material 20 in use. This also helps to enable the generated heat to heat the mass of smokable material 40 in use. In this embodiment, all of the mass of smokable material 40 is located at the centre of the rolled sheet 10. However, in other embodiments, this may not be true. For example, in some embodiments, at least a portion of the mass of smokable material 40 may be sandwiched between overlapping portions of the sheet 10. In some embodiments, the mass of smokable material 40 may be annular in shape or omitted, and the article 7 may be annular in shape.

In each of the above embodiments, the heating material 20 is located on a surface of the sheet 10 comprising reconstituted smokable material. However, in other embodiments, the heating material 20 may be embedded in the sheet 10. For example, in some embodiments, the heating material 20 may be in the form of one or more strips, wires or tracks that are embedded within the sheet 10. In some embodiments, the heating material 20 may be out of contact with the sheet 10, but in thermal communication with the sheet 10 so as still to be heatable to heat the smokable material.

In each of the above embodiments, the heating material 20 is in contact with the smokable material. Thus, when the heating material 20 is heated by penetration with a varying magnetic field, heat may be transferred directly from the heating material 20 to the smokable material. In other embodiments, the heating material 20 may be kept out of contact with the smokable material. For example, in some embodiments, the article may comprise a thermally-conductive barrier that is free of heating material and that spaces the heating material 20 from the smokable material. In some embodiments, the thermally-conductive barrier may be a coating on the heating material 20. The provision of such a barrier may be advantageous to help to dissipate heat to alleviate hot spots in the heating material.

In some embodiments, which may be respective variations to the embodiments discussed above, a first portion of the heating material 20 of the article 1, 2, 3, 4, 5, 6, 7 may be more susceptible to eddy currents being induced therein by penetration with a varying magnetic field than a second portion of the heating material 20 of the article 1, 2, 3, 4, 5, 6, 7. The first portion of the heating material 20 may be more susceptible as a result of the first portion of the heating material 20 being made of a first material, the second portion of the heating material 20 being made of a different second material, and the first material being of a higher susceptibility to eddy currents being induced therein than the second material. For example, one of the first and second portions may be made of iron, and the other of the first and second portions may be made of graphite. Alternatively or additionally, the first portion of the heating material 20 may be more susceptible as a result of a first portion of a component comprising the first portion of the heating material 20 having a different thickness to the second portion of the component that comprises the second portion of the heating material 20.

Such varying susceptibility of the heating material 20 to eddy currents being induced therein can help achieve progressive heating of the smokable material, and thereby progressive generation of vapor. For example, the higher susceptibility portion may be able to heat a first region of the smokable material relatively quickly to initialize volatilization of at least one component of the smokable material and formation of vapor in the first region of the smokable material. The lower susceptibility portion may be able to heat a second region of the smokable material relatively slowly to initialize volatilization of at least one component of the smokable material and formation of vapor in the second region of the smokable material. Accordingly, vapor is able to be formed relatively rapidly for inhalation by a user, and vapor can continue to be formed thereafter for subsequent inhalation by the user even after the first region of the smokable material may have ceased generating vapor. The first region of the smokable material may cease generating the vapor when it becomes exhausted of volatilizable components of the smokable material.

In other embodiments, all of the heating material 20 of the article 1, 2, 3, 4, 5, 6, 7 may be equally, or substantially equally, susceptible to eddy currents being induced therein by penetration with a varying magnetic field. In some embodiments, the heating material 20 may not be susceptible to such eddy currents. In such embodiments, the heating material 20 may be a magnetic material that is non-electrically-conductive, and thus may be heatable by the magnetic hysteresis process discussed above.

In some embodiments, which may be respective variations to the embodiments discussed above, a plurality of the articles 1, 2, 3, 4, 5, 6, 7 may be arranged in a stack. The articles may be adhered to one another in the stack. Each of the articles 1, 2, 3, 4, 5, 6, 7 in the stack may be identical to each other of the articles 1, 2, 3, 4, 5, 6, 7 in the stack. Alternatively, one or more of the articles 1, 2, 3, 4, 5, 6, 7 in the stack may differ in construction from one or more other of the articles 1, 2, 3, 4, 5, 6, 7 in the stack. For example, any one or more of the articles in the stack may be one of the articles 1, 2, 3, 4, 5, 6, 7 discussed above, and one or more other of the articles in the stack may be a different one of the articles 1, 2, 3, 4, 5, 6, 7 discussed above. Smokable material may then be sandwiched between two bodies of heating material.

In some embodiments, which may be respective variations to the embodiments discussed above, the article 1, 2, 3, 4, 5, 6, 7 may comprise a plurality of bodies, wherein each of the bodies comprises heating material 20 that is heatable by penetration with a varying magnetic field. At least one of the plurality of bodies may be more susceptible to eddy currents being induced therein by penetration with a varying magnetic field than at least one of the other of the plurality of bodies. This may be effected by the bodies being made of different heating materials and/or having different thicknesses, for example, as discussed above. Again, such varying susceptibility of the bodies can help achieve progressive heating of the smokable material, and thereby progressive generation of vapor, in a manner corresponding to that described above. The plurality of bodies may be coplanar.

In some embodiments, the article 1, 2, 3, 4, 5, 6, 7 may comprise a catalytic material on at least a portion of the heating material 20. The catalytic material may take the form of a coating on the heating material 20. The catalytic material may be provided on all surface(s) of the heating material 20, or on only some of the surface(s) of the heating material 20. The provision of such a catalytic material on the heating material 20 means that, in use, the article 1, 2, 3, 4, 5, 6, 7 may have a heated, chemically active surface. In use, the catalytic material may act to convert, or increase the rate of conversion of, a potential irritant to something that is less of an irritant.

In some embodiments, which may be respective variations to the embodiments discussed above, the article 1, 2, 3, 4, 5, 6, 7 may comprise a mouthpiece defining a passageway that is in fluid communication with the reconstituted smokable material. The mouthpiece may be made of any suitable material, such as a plastics material, cardboard, cellulose acetate, paper, metal, glass, ceramic, or rubber. In use, when the smokable material is heated, volatilized components of the smokable material can be readily inhaled by a user. In embodiments in which the article is a consumable article, once all or substantially all of the volatilizable component(s) of the smokable material of the article has/have been spent, the user may dispose of the mouthpiece together with the rest of the article 1, 2, 3, 4, 5, 6, 7. This can be more hygienic than using the same mouthpiece with multiple articles, can help ensure that the mouthpiece is correctly aligned with the smokable material, and presents a user with a clean, fresh mouthpiece each time they wish to use another article. The mouthpiece, when provided, may comprise or be impregnated with a flavorant. The flavorant may be arranged so as to be picked up by heated vapor as the vapor passes through the passageway of the mouthpiece in use.

Figure 8:
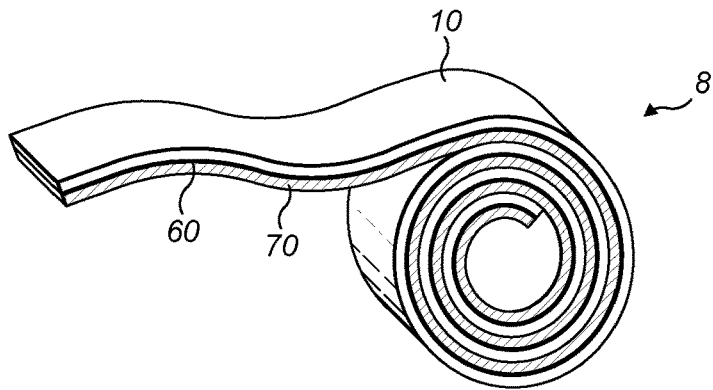
FIG. 8 shows a schematic perspective view of an example of another article for use with apparatus for heating smokable material to volatilize at least one component of the smokable material.

Referring to FIG. 8 there is shown a schematic perspective view of an example of another article according to an embodiment of the disclosure. The article 8 of this embodiment comprises a sheet 10 comprising reconstituted smokable material, and adhesive 60 on a surface of the sheet 10 for adhering the sheet 10 to a carrier.

In this embodiment, the sheet 10 is a rolled sheet 10. This may make the sheet 10 less prone to damage and more convenient to store and handle. However, in variations to the illustrated embodiment, the sheet 10 may instead be planar or substantially planar.

The adhesive 60 may comprise one or more of, for example, gum Arabic, natural or synthetic resins, starches, hydroxyl propyl methyl cellulose, and varnish.

In this embodiment, the article 8 comprises a backing sheet 70. The adhesive 60 is located between the sheet 10 comprising reconstituted smokable material and the backing sheet 70. The article 8 thus comprises a rolled structure having three layers 10, 60, 70.

The backing sheet 70 may comprise any material suitable for ensuring that overlapping layers of the rolled sheet 10 do not become adhered to each other by the adhesive 60 while the sheet 10 remains rolled. For example, the backing sheet 70 may comprise glass fibers, carbon fibers, silk, paper, grease-proof paper, or the like.

In this embodiment, the backing sheet 70 is removable from the adhesive 60 and the sheet 10 comprising reconstituted smokable material to expose the adhesive 60 on a surface of the sheet 10 comprising reconstituted smokable material. In the present embodiment, once the backing sheet 70 has been removed, the sheet 10 may be cut or torn and then adhered to a carrier by a user using the adhesive 60. Such adhesion may reduce or avoid air gaps present between the sheet 10 and the carrier, and provide good thermal coupling between the sheet 10 and the carrier. The article 8 is free of heating material that is heatable by penetration with a varying magnetic field, and it is envisaged that the carrier would comprise such heating material. Accordingly, once the sheet 10 has been adhered to such a carrier, the combination of the sheet 10 and the carrier may be used with apparatus comprising a magnetic field generator for generating a varying magnetic field to be used in heating the heating material of the carrier, and thus the smokable material of the sheet 10. An example such apparatus 100 is that shown in FIG. 9 and described below.

In a variation to this embodiment, the adhesive 60 may be removable with the backing sheet 70 from the sheet 10 comprising reconstituted smokable material. In such a variation, it may be necessary for the user to use a separate adhesive to adhere the sheet 10 comprising reconstituted smokable material to the carrier. Such a separate adhesive may be present on the carrier, or may need to be applied to the carrier and/or to the sheet 10 comprising reconstituted smokable material by a user.

In further variations to this embodiment, the adhesive surface may be a surface of the sheet 10. That is, a surface of the sheet 10 may be inherently tacky or adhesive. In some such embodiments, the article may or may not comprise a backing sheet 70 in contact with the adhesive surface of the sheet 10 and removable to expose the adhesive surface of the sheet 10.

In some embodiments, the surface of the backing sheet 70 opposite from the surface facing the sheet 10 comprising smokable material may be coated or treated to be a non-stick surface.

In a further variation to this embodiment, the backing sheet 70 may be omitted from the article 8. In such further variations, preferably the adhesive 60 is suitable for ensuring that overlapping layers of the rolled sheet 10 do not become adhered to each other by the adhesive 60 while the sheet 10 remains rolled.

In some embodiments, a series of longitudinally-spaced lines of weakness, such as perforations, may extend across the width of the sheet 10 comprising smokable material, and optionally also the backing sheet 70 when provided. These may help a user to detach a predetermined length of the sheet 10 from the rest of the sheet 10 for attachment to the carrier.

In each of the above embodiments, the sheet 10 comprises reconstituted smokable material. However, in other embodiments, the sheet 10 may comprise smokable material in a different form.

For example, in some embodiments, the sheet 10 may carry tobacco extract. A tobacco extract is a composition of tobacco that is obtained by a method comprising the treatment of tobacco with a solvent, and may comprise other treatment steps such as concentration.

The sheet 10 may be a cast or extruded material, suitably formed from a slurry. The sheet 10 may, for example, comprise paper, card, cardboard, or the like. The sheet may comprise a filler and a binder. The filler may be an organic material such as wood pulp, cellulose and cellulose derivatives. The filler may be an inorganic material such as calcium carbonate, perlite, vermiculite, diatomaceous earth, colloidal silica, magnesium oxide, magnesium sulphate and magnesium carbonate. The binder may comprise alginate, polysaccharides, celluloses or modified celluloses, starches or modified starches, or natural gums.

In each of the above embodiments, the sheet 10 comprising reconstituted smokable material may consist entirely or substantially entirely of the reconstituted smokable material. However, in other embodiments, the sheet 10 may comprise one or more materials or ingredients in addition to the reconstituted smokable material.

In each of the above embodiments, the sheet 10 itself is free of heating material. However, in other embodiments, the sheet 10 may comprise heating material in addition to the reconstituted smokable material.

In each of the embodiments discussed above, the sheet 10 or rolled sheet 10 is smooth or substantially smooth. However, in other embodiments, this may not be the case. For example, in some embodiments, the sheet 10 may be corrugated, have protrusions thereon, and/or have indentations therein.

In each of the embodiments discussed above with reference to FIGS. 1 to 5, the sheet 10 is planar or substantially planar. However, in other embodiments, this may not be the case. For example, in some embodiments, the sheet 10 may be corrugated, follow a wavelike or wavy path, be twisted, have protrusions thereon, have indentations therein, and/or have a non-uniform non-planar shape.

Such non-smooth or non-planar shapes may help air passing through the article 1, 2, 3, 4, 5, 6, 7, 8 in use to pick up the volatilized material created when the smokable material is heated. Such shapes can provide a tortuous path for air to follow, creating turbulence in the air and causing better heat transfer from the heating material 20 to the smokable material.

In some embodiments, the article may comprise a mass of thermal insulation radially outwards of the rolled sheet 10. The thermal insulation may comprise one or more materials selected from the group consisting of: aerogel, vacuum insulation, wadding, fleece, non-woven material, non-woven fleece, woven material, knitted material, nylon, foam, polystyrene, polyester, polyester filament, polypropylene, a blend of polyester and polypropylene, cellulose acetate, paper or card, and corrugated material such as corrugated paper or card. The thermal insulation may additionally or alternatively comprise an air gap. Such thermal insulation can help prevent heat loss to components of the apparatus, and provide more efficient heating of the smokable material of the sheet 10. In some embodiments, the insulation may have a thickness of up to one millimeter, such as up to 0.5 millimeters.

In each of the embodiments discussed above, the heating material 20 is aluminum. However, in other embodiments, the heating material 20 may comprise one or more materials selected from the group consisting of: an electrically-conductive material, a magnetic material, and a magnetic electrically-conductive material. In some embodiments, the heating material 20 may comprise a metal or a metal alloy. In some embodiments, the heating material 20 may comprise one or more materials selected from the group consisting of: aluminum, gold, iron, nickel, cobalt, conductive carbon, graphite, plain-carbon steel, stainless steel, ferritic stainless steel, copper, and bronze. Other heating material(s) may be used in other embodiments. In some embodiments, the heating material 20 may be magnetic. It has also been found that, when magnetic electrically-conductive material is used as the heating material 20, magnetic coupling between the magnetic electrically-conductive material and an electromagnet of the apparatus may be enhanced in use. In addition to potentially enabling magnetic hysteresis heating, this can result in greater or improved Joule heating of the heating material 20, and thus greater or improved heating of the smokable material.

In each of the above-described embodiments that comprise adhesive, it is advantageous for the adhesive to be thermally stable and to retain its functionality at the operating temperatures of the apparatus with which the article is to be used. Example operating temperatures are described elsewhere herein.

Each of the above-described articles 1, 2, 3, 4, 5, 6, 7, 8 and described variants thereof may be used with an apparatus for heating the smokable material to volatilize at least one component of the smokable material. The apparatus may be to heat the smokable material to volatilize the at least one component of the smokable material without burning the smokable material. Any one of the article(s) 1, 2, 3, 4, 5, 6, 7, 8 and such apparatus may be provided together as a system. The system may take the form of a kit, in which the article 1, 2, 3, 4, 5, 6, 7, 8 is separate from the apparatus. Alternatively, the system may take the form of an assembly, in which the article 1, 2, 3, 4, 5, 6, 7, 8 is combined with the apparatus. An example such system will now be described with reference to FIG. 9.

Referring to FIG. 9 there is shown a schematic cross-sectional view of an example of a system according to an embodiment of the disclosure. The system 1000 of this embodiment comprises an article 2 and apparatus 100. The article 2 comprises a sheet 10 comprising reconstituted smokable material, and heating material 22a, 22b, 22c, 22d that is heatable by penetration with a varying magnetic field to heat the smokable material. The apparatus 100 is for heating the smokable material of the article 2 to volatilize at least one component of the smokable material.

In this embodiment, the article 2 of the system 1000 is the article 2 of FIG. 2, rolled in such a way that the sheet 10 of the article 2 is a rolled sheet 10 and the strips 22a, 22b, 22c, 22d comprising heating material 20 are arranged so as to be parallel to the longitudinal axis of the rolled sheet 10. However, in other embodiments, the article of the system 1000 may be an article other than the article 2 of FIG. 2, such as any one of the other articles described above. Broadly speaking, the apparatus 100 comprises a heating zone 111 for receiving at least a portion of the article and a magnetic field generator 112 for generating a varying magnetic field to be used in heating the smokable material when the portion of the article is in the heating zone 111.

The apparatus 100 of this embodiment comprises a body 110 and a mouthpiece 120. The mouthpiece 120 defines a channel 122 therethrough. The mouthpiece 120 is locatable relative to the body 110 so as to cover an opening into the heating zone 111. When the mouthpiece 120 is so located relative to the body 110, the channel 122 of the mouthpiece 120 is in fluid communication with the heating zone 111. In use, the channel 122 acts as a passageway for permitting volatilized material to pass from the article 1, 2, 3, 4, 5, 6, 7 inserted in the heating zone 111 to an exterior of the apparatus 100. In this embodiment, the mouthpiece 120 of the apparatus 100 is releasably engageable with the body 110 so as to connect the mouthpiece 120 to the body 110. In other embodiments, the mouthpiece 120 and the body 110 may be permanently connected, such as through a hinge or flexible member. The mouthpiece 120 of the apparatus 100 may comprise or be impregnated with a flavorant. The flavorant may be arranged so as to be picked up by heated vapor as the vapor passes through the channel 122 of the mouthpiece 120 in use. In some embodiments, such as embodiments in which the article 1, 2, 3, 4, 5, 6, 7 itself comprises a mouthpiece, the mouthpiece 120 of the apparatus 100 may be omitted.

In this embodiment, the body 110 comprises the heating zone 111. In this embodiment, the heating zone 111 comprises a recess 111 for receiving at least a portion of the article 2. In other embodiments, the heating zone 111 may be other than a recess, such as a shelf, a surface, or a projection, and may require mechanical mating with the article 1, 2, 3, 4, 5, 6, 7 in order to co-operate with, or receive, the article 1, 2, 3, 4, 5, 6, 7. In this embodiment, the heating zone 111 is elongate, and is sized and shaped to receive the article 2. In this embodiment, the heating zone 111 accommodates the whole article 2. In other embodiments, the heating zone 111 may be dimensioned to receive only a portion of the article 1, 2, 3, 4, 5, 6, 7.

In some embodiments, the apparatus 100 may comprise a mechanism for compressing an article 1, 2, 3, 4, 5, 6, 7 when the article 1, 2, 3, 4, 5, 6, 7 is located in the heating zone 114. Such compression of the article 1, 2, 3, 4, 5, 6, 7 may compress the smokable material, so as to increase the thermal conductivity of the smokable material. In other words, compression of the smokable material can provide for higher heat transfer through the article 1, 2, 3, 4, 5, 6, 7. Such compression should not be so great as to break the article 1, 2, 3, 4, 5, 6, 7 or to prevent a user to be able to draw volatilized material from the article 1, 2, 3, 4, 5, 6, 7.

In this embodiment, the magnetic field generator 112 comprises an electrical power source 113, a coil 114, a device 116 for passing a varying electrical current, such as an alternating current, through the coil 114, a controller 117, and a user interface 118 for user-operation of the controller 117.

In this embodiment, the electrical power source 113 is a rechargeable battery. In other embodiments, the electrical power source 113 may be other than a rechargeable battery, such as a non-rechargeable battery, a capacitor, a battery-capacitor hybrid, or a connection to a mains electricity supply.

The coil 114 may take any suitable form. In this embodiment, the coil 114 is a helical coil of electrically-conductive material, such as copper. In some embodiments, the magnetic field generator 112 may comprise a magnetically permeable core around which the coil 114 is wound. Such a magnetically permeable core concentrates the magnetic flux produced by the coil 114 in use and makes a more powerful magnetic field. The magnetically permeable core may be made of iron, for example. In some embodiments, the magnetically permeable core may extend only partially along the length of the coil 114, so as to concentrate the magnetic flux only in certain regions.

In this embodiment, the coil 114 of the magnetic field generator 112 extends along a longitudinal axis that is substantially coincident with a longitudinal axis of the heating zone 111. In other embodiments, these axes may be aligned with each other by being parallel to each other, or may be oblique to each other.

In this embodiment, an impedance of the coil 114 of the magnetic field generator 112 is equal, or substantially equal, to an impedance of each of the strips 22a, 22b, 22c, 22d comprising heating material 20 of the article 1. If the impedance of one of the strips 22a, 22b, 22c, 22d of the article 2 were instead lower than the impedance of the coil 114, then the voltage generated across the strip in question in use may be lower than the voltage that may be generated across that strip when the impedances are matched. Alternatively, if the impedance of one of the strips 22a, 22b, 22c, 22d of the article 2 were instead higher than the impedance of the coil 114, then the electrical current generated in that strip in use may be lower than the current that may be generated in that strip when the impedances are matched. In embodiments of the system 1000 comprising one of the articles 1, 3, 4, 5, 6, 7 of FIGS. 1 and 3 to 7, similarly the impedance of the coil 114 may be equal, or substantially equal, to an impedance of the part of the article 1, 3, 4, 5, 6, 7 comprising heating material. Matching the impedances may help to balance the voltage and current to maximize the heating power generated at the heating material of the article 1, 2, 3, 4, 5, 6, 7 when heated in use.

In this embodiment, the device 116 for passing a varying current through the coil 114 is electrically connected between the electrical power source 113 and the coil 114. In this embodiment, the controller 117 also is electrically connected to the electrical power source 113, and is communicatively connected to the device 116 to control the device 116. More specifically, in this embodiment, the controller 117 is for controlling the device 116, so as to control the supply of electrical power from the electrical power source 113 to the coil 114. In this embodiment, the controller 117 comprises an integrated circuit (IC), such as an IC on a printed circuit board (PCB). In other embodiments, the controller 117 may take a different form. In some embodiments, the apparatus may have a single electrical or electronic component comprising the device 116 and the controller 117. The controller 117 is operated in this embodiment by user-operation of the user interface 118. In this embodiment, the user interface 118 is located at the exterior of the body 110. The user interface 118 may comprise a push-button, a toggle switch, a dial, a touchscreen, or the like. In other embodiments, the user interface 118 may be remote and connected to the rest of the apparatus wirelessly, such as via Bluetooth.

In this embodiment, operation of the user interface 118 by a user causes the controller 117 to cause the device 116 to cause an alternating electrical current to pass through the coil 114, so as to cause the coil 114 to generate an alternating magnetic field. When the article 1, 2, 3, 4, 5, 6, 7 is located in the heating zone 111, the coil 114 of the apparatus 100 and the heating material 20 of the article 1, 2, 3, 4, 5, 6, 7 are suitably relatively positioned so that the alternating magnetic field produced by the coil 114 penetrates the heating material 20 of the article 1, 2, 3, 4, 5, 6, 7. When the heating material 20 of the article 1, 2, 3, 4, 5, 6, 7 is an electrically-conductive material, this may cause the generation of one or more eddy currents in the heating material 20. The flow of eddy currents in the heating material 20 against the electrical resistance of the heating material 20 causes the heating material 20 to be heated by Joule heating. As mentioned above, when the heating material 20 is made of a magnetic material, the orientation of magnetic dipoles in the heating material 20 changes with the changing applied magnetic field, which causes heat to be generated in the heating material 20.

The apparatus 100 of this embodiment comprises a temperature sensor 119 for sensing a temperature of the heating zone 111. The temperature sensor 119 is communicatively connected to the controller 117, so that the controller 117 is able to monitor the temperature of the heating zone 111. In some embodiments, the temperature sensor 119 may be arranged to take an optical temperature measurement of the recess, heating zone or article 1, 2, 3, 4, 5, 6, 7. In some embodiments, the article 1, 2, 3, 4, 5, 6, 7 may comprise a temperature detector, such as a resistance temperature detector (RTD), for detecting a temperature of the article 1, 2, 3, 4, 5, 6, 7. For example, the temperature detector may be located in or on the sheet 10 of the article 1, 2, 3, 4, 5, 6, 7. The article 1, 2, 3, 4, 5, 6, 7 may further comprise one or more terminals connected, such as electrically-connected, to the temperature detector. The terminal(s) may be for making connection, such as electrical connection, with a temperature monitor of the apparatus 100 when the article 1, 2, 3, 4, 5, 6, 7 is in the heating zone 111. The controller 117 may comprise the temperature monitor. The temperature monitor of the apparatus 100 may thus be able to determine a temperature of the article 1, 2, 3, 4, 5, 6, 7 during use of the article 1, 2, 3, 4, 5, 6, 7 with the apparatus 100.

In some embodiments, by providing that a component of the article 1, 2, 3, 4, 5, 6, 7 comprising the heating material 20 has a suitable resistance, the response of the heating material 20 to a change in temperature could be sufficient to give information regarding temperature inside the article 1, 2, 3, 4, 5, 6, 7. The temperature sensor 119 of the apparatus 100 may then comprise a probe for analyzing the heating material.

On the basis of one or more signals received from the temperature sensor 119 or temperature detector, the controller 117 may cause the device 116 to adjust a characteristic of the varying or alternating electrical current passed through the coil 114 as necessary, in order to ensure that the temperature of the heating zone 111 remains within a predetermined temperature range. The characteristic may be, for example, amplitude or frequency. Within the predetermined temperature range, in use the smokable material within an article 1, 2, 3, 4, 5, 6, 7 located in the heating zone 111 is heated sufficiently to volatilize at least one component of the smokable material without combusting the smokable material. Accordingly, the controller 117, and the apparatus 100 as a whole, is arranged to heat the smokable material to volatilize the at least one component of the smokable material without combusting the smokable material. In some embodiments, the temperature range is about 50° C. to about 300° C., such as between about 50° C. and about 250° C., between about 50° C. and about 150° C., between about 50° C. and about 120° C., between about 50° C. and about 100° C., between about 50° C. and about 80° C., or between about 60° C. and about 70° C. In some embodiments, the temperature range is between about 170° C. and about 220° C. In other embodiments, the temperature range may be other than this range. In some embodiments, the temperature sensor 119 may be omitted.

The apparatus 100 may define an air inlet that fluidly connects the heating zone 111 with the exterior of the apparatus 100. Such an air inlet may be defined by the body 110 of the apparatus 100 and/or by the mouthpiece 120 of the apparatus 100. A user may be able to inhale the volatilized component(s) of the smokable material by drawing the volatilized component(s) through the channel 122 of the mouthpiece 120. As the volatilized component(s) are removed from the article 1, 2, 3, 4, 5, 6, 7, air may be drawn into the heating zone 111 via the air inlet of the apparatus 100.

The apparatus may provide haptic feedback to a user. The feedback could indicate that heating is taking place, or be triggered by a timer to indicate that greater than a predetermined proportion of the original quantity of volatilizable component(s) of the smokable material of the article 1, 2, 3, 4, 5, 6, 7 has/have been spent, or the like. The haptic feedback could be created by interaction of the coil 114 with the heating material of the article 1, 2, 3, 4, 5, 6, 7 (e.g. magnetic response), by interaction of an electrically-conductive element with the coil 114, by rotating an unbalanced motor, by repeatedly applying and removing a current across a piezoelectric element, or the like.

The apparatus 100 may comprise more than one coil. The plurality of coils of the apparatus 100 could be operable to provide progressive heating of the smokable material in an article 1, 2, 3, 4, 5, 6, 7, and thereby progressive generation of vapor. For example, one coil may be able to heat a first region of the heating material 20 relatively quickly to initialize volatilization of at least one component of the smokable material and formation of a vapor in a first region of the smokable material. Another coil may be able to heat a second region of the heating material 20 relatively slowly to initialize volatilization of at least one component of the smokable material and formation of a vapor in a second region of the smokable material. Accordingly, a vapor is able to be formed relatively rapidly for inhalation by a user, and vapor can continue to be formed thereafter for subsequent inhalation by the user even after the first region of the smokable material may have ceased generating vapor. The initially-unheated second region of smokable material could act as a heat sink, to reduce the temperature of created vapor or make the created vapor mild, during heating of the first region of smokable material.

In some embodiments, the article 1, 2, 3, 4, 5, 6, 7 may comprise a plurality of discrete portions of heating material 20 that is heatable by penetration with a varying magnetic field to heat the smokable material of the article 1, 2, 3, 4, 5, 6, 7. The plurality of discrete portions of heating material 20 may be substantially separately heatable by varying magnetic fields produced by a respective plurality of coils 114 of the apparatus 100. One of the plurality of discrete portions of heating material 20 may be more susceptible to eddy currents being induced therein by penetration with a varying magnetic field than other(s) of the plurality of discrete portions of heating material 20. Such a structure could be operable to provide progressive heating of the smokable material of the article 1, 2, 3, 4, 5, 6, 7, and thereby progressive generation of vapor, in a similar way to that described above.

In some embodiments, a component comprising the heating material 20 may comprise discontinuities or holes therein. Such discontinuities or holes may act as thermal breaks to control the degree to which different regions of the smokable material are heated in use. Areas of the heating material 20 with discontinuities or holes therein may be heated to a lesser extent that areas without discontinuities or holes. This may help progressive heating of the smokable material, and thus progressive generation of vapor, to be achieved. Such discontinuities or holes may, on the other hand, be used to optimize the creation of complex eddy currents in use.

In each of the above described embodiments, the smokable material comprises tobacco. However, in respective variations to each of these embodiments, the smokable material may consist of tobacco, may consist substantially entirely of tobacco, may comprise tobacco and smokable material other than tobacco, may comprise smokable material other than tobacco, or may be free of tobacco. In some embodiments, the smokable material may comprise a vapor or aerosol forming agent or a humectant, such as glycerol, propylene glycol, triacetin, or diethylene glycol.

An article embodying the present disclosure may be a cartridge, for example.

In each of the above described embodiments, the article 1, 2, 3, 4, 5, 6, 7, 8 is a consumable article. Once all, or substantially all, of the volatilizable component(s) of the smokable material of the article 1, 2, 3, 4, 5, 6, 7, 8 has/have been spent, the user may dispose of the article 1, 2, 3, 4, 5, 6, 7, 8. The user may subsequently re-use the apparatus with another of the articles 1, 2, 3, 4, 5, 6, 7, 8. However, in other respective embodiments, the article 1, 2, 3, 4, 5, 6, 7, 8 may be non-consumable, and the apparatus and the article 1, 2, 3, 4, 5, 6, 7, 8 may be disposed of together once the volatilizable component(s) of the smokable material has/have been spent.

In some embodiments, the apparatus discussed above is sold, supplied or otherwise provided separately from the articles 1, 2, 3, 4, 5, 6, 7, 8 with which the apparatus is usable. However, in some embodiments, the apparatus and one or more of the articles 1, 2, 3, 4, 5, 6, 7, 8 may be provided together as a system, such as a kit or an assembly, possibly with additional components, such as cleaning utensils.

Embodiments of the disclosure could be implemented in a system comprising any one of the articles discussed herein, and any one of the apparatuses discussed herein, wherein the apparatus itself has heating material, such as in a susceptor, for heating by penetration with the varying magnetic field generated by the magnetic field generator. Heat generated in the heating material of the apparatus could be transferred to the article to heat, or further heat, the smokable material therein when the portion of the article is in the heating zone 111.

In order to address various issues and advance the art, the entirety of this disclosure shows by way of illustration and example various embodiments in which the claimed invention may be practiced and which provide for superior articles for use with apparatus for heating smokable material to volatilize at least one component of the smokable material, and superior systems comprising such apparatus and such articles. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. An article for use with an apparatus for heating smokable material to volatilize at least one component of the smokable material, the article comprising:
    a sheet comprising smokable material; and
    heating material that is heatable by penetration with a varying magnetic field to heat the smokable material, at least a portion of the heating material arranged in a discrete body in the form of a strip of heating material;
    wherein the sheet is corrugated and has a non-uniform and non-planar shape;
    wherein the strip of heating material has a length that is at least as long as a length of the smokable material; and
    wherein all or substantially all of the strip of heating material is contacted by the sheet of smokable material but the strip of heating material and the sheet of smokable material are not adhered to one another.

2. The article of claim 1, wherein at least a second portion of the heating material is arranged in a plurality of additional discrete bodies on a surface of the sheet.

3. The article of claim 2, wherein each of the plurality of additional discrete bodies comprises a tube of heating material or a strip of heating material.

4. The article of claim 1, wherein the strip of heating material is in the form of at least one spiral or closed circuit.

5. The article of claim 1, further comprising ink on the sheet, wherein the ink comprises the heating material.

6. The article of claim 1, wherein the heating material comprises one or more materials selected from the group consisting of an electrically-conductive material, a magnetic material, and a magnetic electrically-conductive material.

7. The article of claim 1, wherein the heating material comprises a metal or a metal alloy.

8. The article of claim 1, wherein the heating material comprises one or more materials selected from the group consisting of aluminum, gold, iron, nickel, cobalt, conductive carbon, graphite, plain-carbon steel, stainless steel, ferritic stainless steel, copper, and bronze.

9. The article of claim 1, wherein the smokable material comprises at least one of tobacco or one or more humectants.

10. A system, comprising:
    an apparatus for heating smokable material to volatilize at least one component of the smokable material; and
    an article for use with the apparatus, the article comprising a sheet comprising smokable material, and heating material that is heatable by penetration with a varying magnetic field to heat the smokable material, at least a portion of the heating material arranged in a discrete body in the form of a strip of heating material wherein the sheet is corrugated and has a non-uniform and non-planar shape, and wherein the strip of heating material has a length that is at least as long as a length of the smokable material, and wherein all or substantially all of the strip of heating material is contacted by the sheet of smokable material but the strip of heating material and the sheet of smokable material are not adhered to one another; and wherein the apparatus comprises a heating zone for receiving at least a portion of the article, and a magnetic field generator for generating a varying magnetic field to be used in heating the smokable material when the portion of the article is in the heating zone.

* * * * *